(12) United States Patent
DeLorme et al.

(10) Patent No.: US 8,265,064 B2
(45) Date of Patent: *Sep. 11, 2012

(54) SYSTEMS, METHODS AND COMPUTER PRODUCTS FOR LOGGING OF OUTGOING CALLS TO AN INTERNET PROTOCOL TELEVISION CALL LOG

(75) Inventors: David DeLorme, Stone Mountain, GA (US); Jeffrey Cassanova, Villa Rica, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1173 days.

This patent is subject to a terminal disclaimer.

(21) Appl. No.: 11/780,748

(22) Filed: Jul. 20, 2007

(65) Prior Publication Data

US 2009/0022142 A1  Jan. 22, 2009

(51) Int. Cl.
  *H04L 12/66* (2006.01)
  *H04M 1/56* (2006.01)
  *H04M 11/10* (2006.01)
(52) U.S. Cl. .............. 370/352; 379/142.16; 455/413
(58) Field of Classification Search ............ 379/102.03, 379/32.01, 35, 67.1–88.28, 126, 201.01, 379/210.02, 210.03, 211.01, 212.01, 213.01; 370/352–356; 725/32, 34
See application file for complete search history.

(56) References Cited

U.S. PATENT DOCUMENTS

| | | | |
|---|---|---|---|
| 6,343,220 B1 | 1/2002 | Van Der Salm | |
| 6,882,709 B1* | 4/2005 | Sherlock et al. | ........... 379/90.01 |
| 7,013,129 B2 | 3/2006 | Goss et al. | |
| 7,251,317 B1* | 7/2007 | Robbins et al. | ........... 379/114.21 |
| 7,499,704 B1 | 3/2009 | Bonner | |
| 2003/0093808 A1* | 5/2003 | Eyer et al. | .................... 725/111 |
| 2004/0028203 A1 | 2/2004 | Wurster et al. | |
| 2005/0123118 A1* | 6/2005 | Terry et al. | ............... 379/211.02 |
| 2006/0031904 A1* | 2/2006 | Groff et al. | ................... 725/106 |
| 2006/0115062 A1 | 6/2006 | Gonder et al. | |
| 2006/0262913 A1 | 11/2006 | Cook et al. | |
| 2006/0286984 A1 | 12/2006 | Bonner | |
| 2007/0206748 A1 | 9/2007 | Cassanova et al. | |
| 2008/0104630 A1 | 5/2008 | Bruce et al. | |

* cited by examiner

*Primary Examiner* — Asad M Nawaz
*Assistant Examiner* — Joel Hamel
(74) *Attorney, Agent, or Firm* — Cantor Colburn LLP

(57) ABSTRACT

Systems, methods and computer products for the logging of outgoing calls to an Internet Protocol Television call log. Exemplary embodiments include a method for logging outgoing communication requests related to an Internet-Protocol-enabled device, the method including receiving a request to initiate a communication request from an Internet Protocol-enabled device having an Internet-Protocol-enabled device address, mapping the Internet Protocol-enabled device address of a calling party to a calling party number, retrieving caller identification information associated with the called party and recording the caller identification information in a log associated with the Internet Protocol-enabled device.

13 Claims, 20 Drawing Sheets

SYSTEMS, METHODS AND COMPUTER PRODUCTS FOR LOGGING OF OUTGOING CALLS TO AN INTERNET PROTOCOL TELEVISION CALL LOG

This application is related to commonly assigned U.S. patent application Ser. No. 11/780,746, entitled SYSTEMS, METHODS AND COMPUTER PRODUCTS FOR PLACING TELEPHONE CALLS VIA INTERNET PROTOCOL TELEVISION CALL LOGS, filed on Jul. 20, 2007. This application is also related to commonly assigned U.S. patent application Ser. No. 11/780,728, entitled SYSTEMS, METHODS AND COMPUTER PRODUCTS FOR VOICEMAIL VIA INTERNET PROTOCOL TELEVISION, filed On Jul. 20, 2007. This application is also related to commonly assigned U.S. patent application Ser. No. 11/780,760, entitled SYSTEMS, METHODS AND COMPUTER PRODUCTS FOR LOGGING OF INCOMING CALLS TO AN INTERNET PROTOCOL TELEVISION CALL LOG, filed On Jul. 20, 2007. This application is also related to commonly assigned U.S. patent application Ser. No. 11/780,788, entitled SYSTEMS, METHODS AND COMPUTER PRODUCTS FOR INTERNET PROTOCOL TELEVISION MESSAGE WAITING INDICATION, filed On Jul. 20, 2007. This application is also related to commonly assigned U.S. patent application Ser. No. 11/780,770 entitled SYSTEMS, METHODS AND COMPUTER PRODUCTS FOR INTERNET PROTOCOL TELEVISION VOICEMAIL MONITORING, filed On Jul. 20, 2007. Each of the above applications is incorporated by reference herein in its entirety.

BACKGROUND

The present invention relates generally to telecommunications, and more particularly, to systems, methods and computer products for the logging of outgoing calls to an Internet Protocol Television call log.

Contemporary cable and satellite television systems generally utilize a set-top box on the subscriber's premises. Sometimes limited set-top box functionality is built into the television, but the set-top box and the television are generally separate devices. The set-top box performs authentication, authorization, and accounting functions. However, a primary function of the set-top box (at least from the customer's viewpoint) is channel selection, including presenting the list of channels available to the customer. This list is often referred to as the electronic programming guide (EPG). Furthermore, Internet Protocol Television (IPTV) utilizes set-top boxes to decode programming delivered over the IP network. This additional power can also be leveraged to provide more flexible services to customers. IPTV set top boxes are being designed to allow functions such as access to Interact content (weather, maps, video, music), and access to local video content (e.g., viewing the security camera at the apartment front gate or pool area).

While contemporary cable and satellite television systems offer limited phone services such as voice over Internet Protocol (VOIP), for subscribers who use conventional telephony telecommunications networks such as via public switched telephone network (PSTN) networks, phone interaction with the set top box and the television is limited if not non-existent. For example, a subscriber can place a phone call to enable the set top box to present a pay-per-view program to the attached television. Currently, there are no call management features (e.g., caller identification, voicemail services, call logging, etc.) available for interaction between PSTN and IPTV systems.

It is therefore desirable to provide a means for providing call management service and capabilities to IPTV devices where the called device is supported, by a telephony network.

BRIEF SUMMARY

Exemplary embodiments include a method for logging outgoing communication requests related to an Internet-Protocol-enabled device, the method including receiving a request to initiate a communication request from an Internet Protocol-enabled device having an Internet-Protocol-enabled device address, mapping the Internet Protocol-enabled device address of a calling party to a calling party number, retrieving caller identification information associated with the called party and recording the caller identification information in a log associated with the Internet Protocol-enabled device.

Additional exemplary embodiments include a system for logging outgoing communication requests related to an Internet-Protocol-enabled device, the system including a computer processing, device and an outgoing call logging application executing on the computer processing device, the outgoing call logging application receiving a request to Initiate a communication request from an Internet Protocol-enabled device having an Internet-Protocol-enabled device address, mapping the Internet Protocol-enabled device address of a calling party to a calling party number, retrieving caller identification information associated with the called party and recording the caller identification information in a log associated with the Internet Protocol-enabled device.

Further exemplary embodiments include a computer program product for logging outgoing calls related, to an Internet Protocol-enabled device, the computer program product including instructions for causing a computer to implement a method, the method including receiving a request to initiate a communication request from an Internet Protocol-enabled device having an Internet-Protocol-enabled device address, mapping the Internet Protocol-enabled device address of a calling party to a calling party number, retrieving caller identification information associated with the called party and recording the caller identification information in a log associated with, the Internet Protocol-enabled device, Other systems, methods, and/or computer program, products according to embodiments will be or become apparent to one with skill in the art upon review of the following drawings and detailed description. It is intended that all such additional, systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGS..

The detailed description explains the exemplary embodiments, together with advantages and features, by way of example with reference to the drawings.

DETAILED DESCRIPTION OF EXEMPLARY EMBODIMENTS

Exemplary embodiments include Internet Protocol Television (IPTV) systems that interface with telecommunications (e.g., telephony) networks, thereby providing an IPTV converged services system. In exemplary embodiments, voicemail can be accessed and managed via IPTV. In other exemplary embodiments, phone calls can be placed or returned from an IPTV call log accessible through an IPTV communications device, such as a set top box and television. In other exemplary embodiments, both incoming and outgoing calls can be logged into the above-mentioned call log. In other exemplary embodiments, voicemail, as described above, can be monitored during reception of the voicemail. In exemplary embodiments, various message formats that can be received in an IPTV system provide a message waiting indication on the communications device.

Figure 1A:
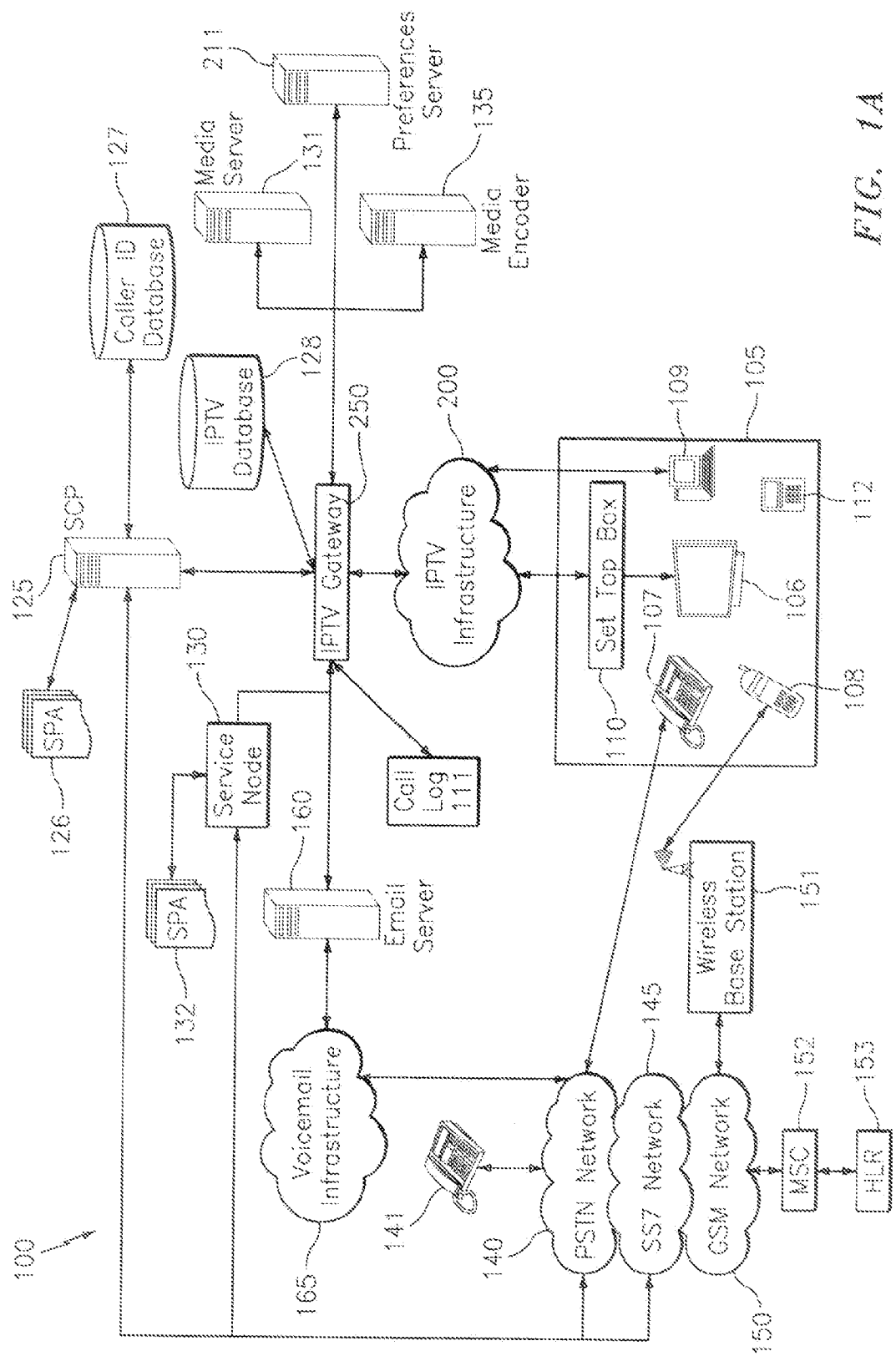
FIG. 1A illustrates a block diagram of an exemplary IPTV call management system.

Turning now to FIG. 1A, a block diagram of an exemplary IPTV converged services system 100, which, implements voicemail via IPTV services in accordance with exemplary embodiments is now described.

For ease of illustration, the system of FIG. 1A depicts a simplified network infrastructure. It is understood that a variety of network components/nodes may be utilized in implementing the embodiments described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 106 (e.g., an IPTV-enabled television) coupled to a set top box 110, subscriber call devices 107, 108 and a subscriber computer 109. The accounts may thus include phone, network access and IPTV services and may be used to provide access to the converged services as described further herein. Furthermore, in exemplary embodiments, one of the devices can be provisioned for the network services described herein by associating a device identifier of the communications device with a respective account. According to exemplary embodiments, the account, in turn, identifies each of the communications devices belonging to the community and provides other information as described herein.

It is appreciated to those skilled in the art that the networks discussed herein may include circuit-switched and/or packet-switched technologies and devices, such as routers, switches, and/or hubs, for facilitating communications between various types of communications devices such as the communications device 106, wireline phone 107, wireless phone 108, subscriber computer 109, an IPTV infrastructure 200 (discussed below), and an IPTV gateway 250 (discussed below). Other networks may include wireline and/or wireless components utilizing, e.g., 802.11 standards for providing over-the-air transmissions of communications.

As discussed above, the system 100 of FIG. 1A includes the subscriber location 105, such as the subscriber's household. The subscriber location 105 can include the communications device 106 (e.g., an IPTV-enabled television, etc.) in communication with the set top box 110. The set top box 110 can have access to a call log 111 into which calls made to and from the subscriber call devices 107, 108 can be logged into the call log 111 and communicated to the set top box 110, which are implemented as part of the converged services described herein. In exemplary embodiments, the call log 111 resides on the IPTV gateway 250 and can reside on the set top box 110. The subscriber location 105 can further include a remote control 112 for control and navigation of the communications device 106. The subscriber location 105 can further include subscriber call devices 107, 108. Subscriber call device 107 is illustrated as a wireline telephone associated with an account that also services the communications device 106 (e.g., both devices are within the community of a single account or household and may be co-located at a single customer premises (i.e., the subscriber location 105)). The subscriber call device 108 is illustrated as a wireless telephone associated with the account that also services the communications device 106, and the subscriber call device 107. It is appreciated that several other subscriber call devices are possible including but not limited a SIP telephone, dual-mode mobile telephone, personal digital assistant (PDA), or other type of communications device, and that the subscriber cab devices 107, 108 are shown and discussed for illustrative purposes. The subscriber location 105 can further include the subscriber computer 109 for communication with networks such as the Internet (not shown) and the IPTV infrastructure 200.

The system 100 can implement converged services such that calls made and received by the subscriber can be managed through the subscriber's IPTV-enabled device, such as the communications device 106, via the set top box 110. As such, the system 100 may further include the IPTV infrastructure 200 in communication with the IPTV gateway 250 (discussed further with respect to FIG. 1B below). In exemplary embodiments, the IPTV infrastructure 200 can be an IP-based network that receives network data (e.g., call information) from a controller server 125, and delivers the call information to the set top box 110 for display or other rendering on the communications device 106. The IPTV gateway 250 is in communication with the controller server 125 (e.g., service control point (SCP) server or application server). The controller server 125 may also communicate with other networks as discussed further in the description below, for example. According to exemplary embodiments, one or more service package applications (SPAs) 126 reside on the controller server 125 and are implemented for the converged services as described further below. The SPA applications 126 can implement several of the converged services, described herein, such as those that involve call processing. For example, the SPA applications 126 can implement caller identification, voicemail monitoring, and outgoing call logging. In exemplary embodiments, the SPA applications 126 handle communication to and from the IPTV gateway 250, as described herein. The SPA application 126 can be a program having logic, voice files, data structures, etc. for call processing.

In exemplary embodiments, the system 100 can further include one or more service nodes 130. The service nodes 130 can place and bridge multiple calls to implement the converged services described herein. As such the service nodes 130 are in communication with a public switched telephone network (PSTN) 140. The PSTN 140 may include central office switches (not shown), which in turn may include service switching point (SSP) functionality (not shown). According to exemplary embodiments, the switches originate and/or terminate calls and communicate over a signaling system 7 (SS7) network 145 with the controller system 125 and a caller identification name database 127 to determine how to route a call, or set up and manage a call feature such as the converged services. It is appreciated that the controller server 125 and the service nodes 130 can be part of an advanced intelligent network (AIN). The service nodes 130 can include additional SPA applications 132, which can be implemented to handle call services such as placing and bridging phone calls. For example, the SPA applications 132 can implement call return via an IPTV call log service, and voicemail monitoring services. The SPA applications 132 may be initiated as a result of termination attempt triggering events or off hook delay trigger events, as described herein.

In exemplary embodiments, the controller server 125 is in further communication with the caller identification database (e.g., CNAM database) 127. The caller identification database 127 may include a table of telephony subscriber information (e.g., subscriber names and numbers) and is configured to map the names to the caller party numbers received at the controller server 125 upon a request from the controller server, or other component of the system 100. In exemplary embodiments, the IPTV database 128 contains IPTV addresses for IPTV-enabled communications devices (e.g., the communications device 106), each of which are mapped to another communications device address (e.g., telephone number assigned to a user of the subscriber call devices 107, 108). The addresses for these devices 106-108 are mapped to one another, such that caller identification information for a call that is directed to a first communications device via a voice network (e.g., the subscriber call devices 107, 108) is transmitted to, and presented on, an IPTV-enabled communications device (e.g., the communications device 106) over a data network (e.g., the IPTV infrastructure 200). As discussed above, the controller server 125 executes the SPA application 126 for implementing such converged services.

Referring still to FIG. 1A, the IPTV gateway 250 is in further communication with a media server 131 that provides media resources used in exemplary implementations of the converged services. For example, as discussed further below, the media server 131 can be implemented to coordinate voicemail translations from a .wav format to a .wma format via a media encoder 135, which is also in communication with the IPTV gateway 250.

In exemplary embodiments, the controller server 125 is implemented to coordinate translation and call data from the SS7 network 145, which provides call connection control. The SS7 network 145 may include various network elements, such as signal transfer points (STPs) (not shown), packet switches for routing call signaling traffic through the system 100. The SS7 network 145 may transmit the call signals via reserved channels, or signaling links, that connect central offices (not shown) of the PSTN 140 and other network elements.

In further exemplary embodiments, a global system for mobile communications (GSM) network 150 or other mobile communications network can be in communication with the SS7 network 145 for implementing wireless communications via a wireless base station/cell tower 151 to the subscriber call device 108. Those skilled in the art also appreciate that the GSM network 150 is in further communication with a mobile switching center (MSC) 152, which is responsible for routing incoming and outgoing calls within the GSM network or to and from a wireline network (e.g., the PSTN 140) or to and from other wireless networks. The MSC 152 queries a home location register (HLR) 153, which provides the administrative information required to authenticate, register and locate the subscriber call device 108. In alternate exemplary embodiments, the caller and/or the called party may be served by an IMS-based telecommunications network that is capable of responding to triggering events, and is in communication with the caller identification database 127 by SS7 or IP connectivity.

Therefore, the subscriber call device 107 can be in communication with the PSTN 140, which can further be in communication with an external call device 141. Furthermore, the subscriber call device 108 (which can include a subscriber identity module (SIM) card) can be in communication with the wireless base station/cellular tower 151, and thus in communication with the external call device 141 via the GSM network 150, the SS7 network 145 and PSTN 140. The external calling device 141 is understood to be a phone or other device used to make and receive calls that is used to communicate with the call devices such as the subscriber call devices 107, 108, associated with the subscriber location 105, such that converged services service can be implemented with respect to calls made and received to the subscriber location 105. Therefore, it is appreciated that there may he several triggers that, upon detection, trigger the SPA application 126 to process the incoming or outgoing call signal and implement by the converged services as described herein. For simplicity of discussion, the subscriber call device 107, a wireline device, is described herein and is further described as being in communication with the external call device 141, which is considered a wireline device for further simplicity of discussion. It is understood and appreciated that the external call device 141 can be other call devices including but not limited a cellular phone, a SIP telephone, dual-mode mobile telephone, personal digital assistant (PDA), or other type of communications device.

Referring still to FIG. 1A, the IPTV gateway 250 is further in communication with an email server 160, which is in communication with a voicemail infrastructure 165 (e.g., Post Office Protocol version 3 (POP3)). It is appreciated that the voicemail infrastructure 165 can be any known voicemail system in communication with the PSTN 140, which manages voicemail left, for example, by a user of the external call device 141 when a call is not answered by the subscriber call device 107, 108. According to exemplary embodiments, the voicemail infrastructure 165 is in communication with the email server 160 such that indications can be made to the IPTV gateway 250 when there is a voicemail, as described herein.

Figure 1B:
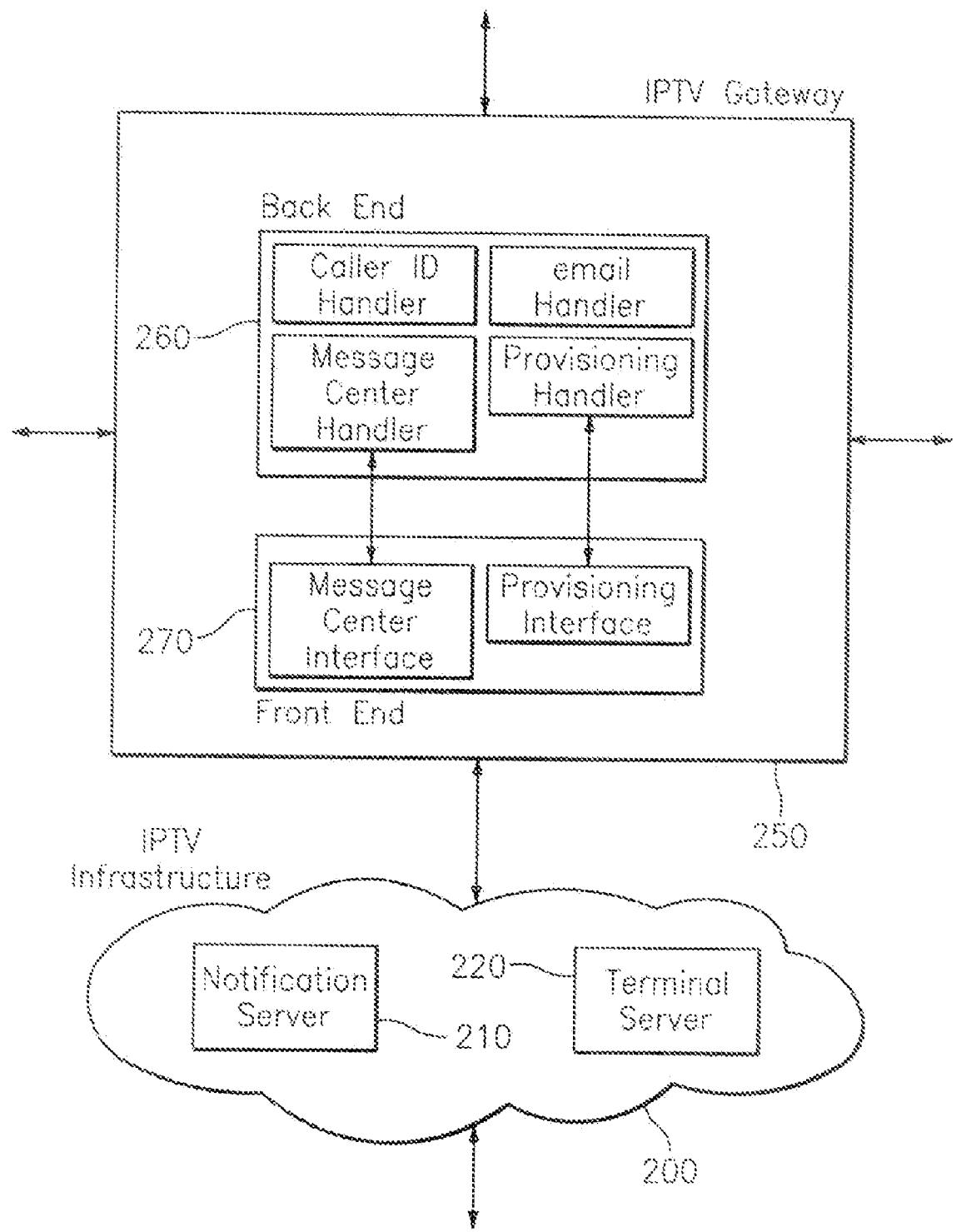
FIG. 1B illustrates a block diagram of an expanded view of an exemplary IPTV infrastructure and an exemplary IPTV gateway of FIG. 1.

FIG. 1B illustrates a block diagram of an expanded view of an exemplary embodiment of the IPTV infrastructure 200 and an exemplary embodiment of the IPTV gateway 250 of FIG. 1. In exemplary embodiments, the IPTV infrastructure 200 provides an interface between the subscriber location 105 and the IPTV gateway 250. The IPTV infrastructure 200 further handles account to the set top box 110 mapping of messages and other information, as discussed further below. In exemplary implementations, a notification server 210 and a terminal server 220 operate to interface communication between the subscriber location 105 via the set top box 110, and the IPTV gateway 250. For example, in exemplary implementations, as discussed below, when the set top box 110 provides a unique identification number, a message is passed between the notification server 210 and the set top box 110.

The IPTV gateway 250 provides an interlace between the controller server 125 and the IPTV infrastructure 200 and the subscriber location 105. As discussed above and described in greater detail below, the IPTV gateway 250 handles notifications to the IPTV subscriber and further provides a history of the notifications. Furthermore, the IPTV gateway 250 handles account to telephone mapping as discussed further herein. In addition, the IPTV gateway 250 interfaces with the various system 100 elements as described herein. For example, the IPTV gateway 250 is in communication with the voicemail infrastructure 165 to retrieve messages (e.g., EMAIL messages) regarding voicemail notifications. The IPTV gateway 250 is in further communication with the media server 131 and media encoder 135 for voicemail encoding, for example. The IPTV gateway 250 is also in communication with the controller server 125 for handling caller identification information received from the PSTN 140, for example. In exemplary embodiments, the IPTV gateway 250 can include a back end 260 and a front end 270. The front end 270 can be used to implement various provisioning activities such as but not limited to initial provisioning of phone numbers and IPTV addresses. The back end 260, as described further herein, is implemented for many of the converged services. As such, the back end 260 can include various elements including but not limited to a caller ID handler, email handler, message handler, and provisioning handler.

In exemplary embodiments, one of the devices, such as the communications device 106 (and the set top box 110 combination) can be used to establish account services, such as the converged services described herein. An account record may be generated for the subscriber at the subscriber location 105, which identifies the subscriber and the account for the services (e.g., basic account services as described above and converged services described herein). Account information and records may be stored in a storage device accessible by the IPTV gateway 250. In exemplary embodiments, the IPTV gateway 250 implements one or more applications for establishing and utilizing a converged services service account. A converged services service account may thus be created for a community of communications devices (e.g., the communications device 106, subscriber call devices 107, 108, and/or subscriber computer 109) to enable the communications devices to implement the converged services as described herein. A preferences server 211 (FIG. 1A) includes preferences information for the subscriber location 105 as described further herein.

In exemplary embodiments, the IPTV gateway 250 may implement authentication using a high-speed processing device (e.g., a computer system) that is capable of handling high volume activities conducted via communications devices, and other network entities (e.g., parts of the IPTV infrastructure 200, base station or cell tower 151, and a public switched telephone network (PSTN) network 140) via one or more networks (e.g., the IPTV Infrastructure 200, etc. as described herein). The IPTV gateway 250 receives requests from one or more devices from the subscriber location 105 either to establish a converged services service account or to access network services, such as the converged services. The IPTV gateway 250 may implement authentication software for restricting or controlling access to network services. The IPTV gateway 250 may be in communication with a customer identity system (CIS) database, which stores subscriber credentials (e.g., subscriber names and passwords) established via the converged services account.

Figure 2:
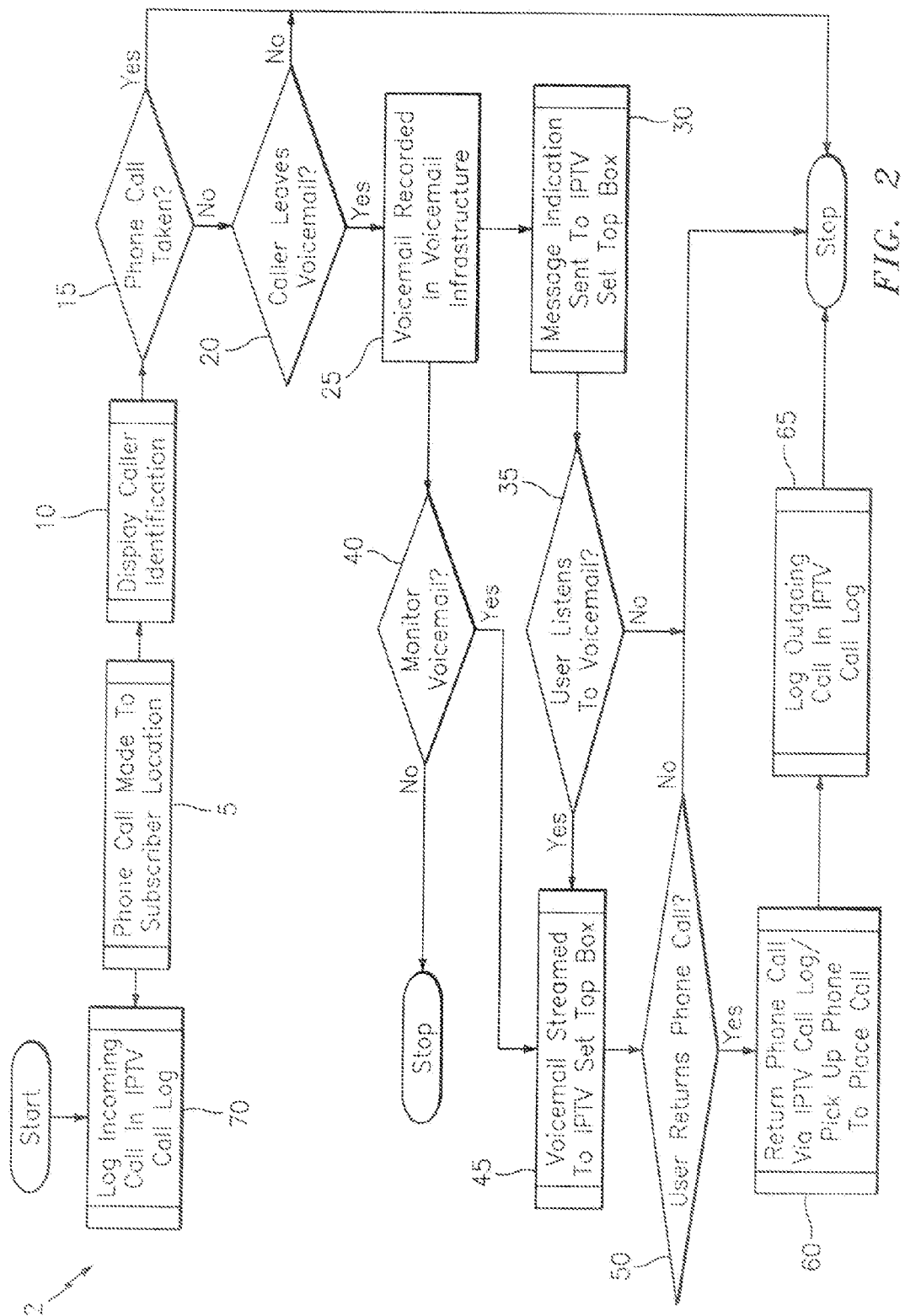
FIG. 2 illustrates an IPTV call management method in accordance with, exemplary embodiments.

FIG. 2 illustrates an IPTV converged services method 2 in accordance with exemplary embodiments. The method 2 illustrates an overall exemplary IPTV converged services flow, with specific sub-flows discussed subsequently with respect to the figures described below.

In exemplary embodiments, an external user makes a phone call to the subscriber location 105 using the external calling device 141 over a voice network such as the PSTN 140 at step 5. A central office switch or SSP of the PSTN 140 receives the communication (e.g., communication signaling), resulting in a termination attempt trigger. The trigger causes a communication request to proceed over the SS7 network 145 via, e.g., a signal transfer point (STP). The communication request is received at the controller server 125. The communication request includes call-related information, e.g., called party number (e.g., a number assigned with the subscriber call devices 107, 108) and caller party number associated with a communications device such as the external call device 141. According to exemplary embodiments, the caller SPA application 126 authorizes a communication session between the called party device and the caller party device via a return reply (e.g., termination authorization signal) over the signaling network (e.g., the SS7 network 145). At the same time, the SPA 126 searches the caller identification database 127 for calling party identification information (e.g., caller name). The calling party identification information is retrieved from the database 127. The IPTV gateway 250 further searches the IPTV database 128 for the called party number. The called party number may be used to map communications address information for devices, such as the communications device 106 and/or the set top box 110. The IPTV gateway 250 further retrieves an IPTV address mapped to the called party number. The IPTV address may be a uniform resource locator (URL), Internet address, or other type of address. The calling party identification information is transmitted over a data network (e.g., the IPTV infrastructure 200) via the IPTV gateway 250 to the IPTV-enabled communications device assigned to the IPTV address (e.g., the communications device 106 and/or the set top box 110). As discussed further below, the calling party identification information may be transmitted to the set top box 110 of the IPTV-enabled communications device 106 using, e.g., UDP/HTTP protocols, where the calling party identification information is displayed or otherwise rendered on the IPTV device at step 210 (see FIG. 3A). In exemplary embodiments, the preferences server 211 may include information specifying which of several IPTV set top boxes, such as the set top box 110, have requested to receive caller information, and which have not, etc.

Figure 5:
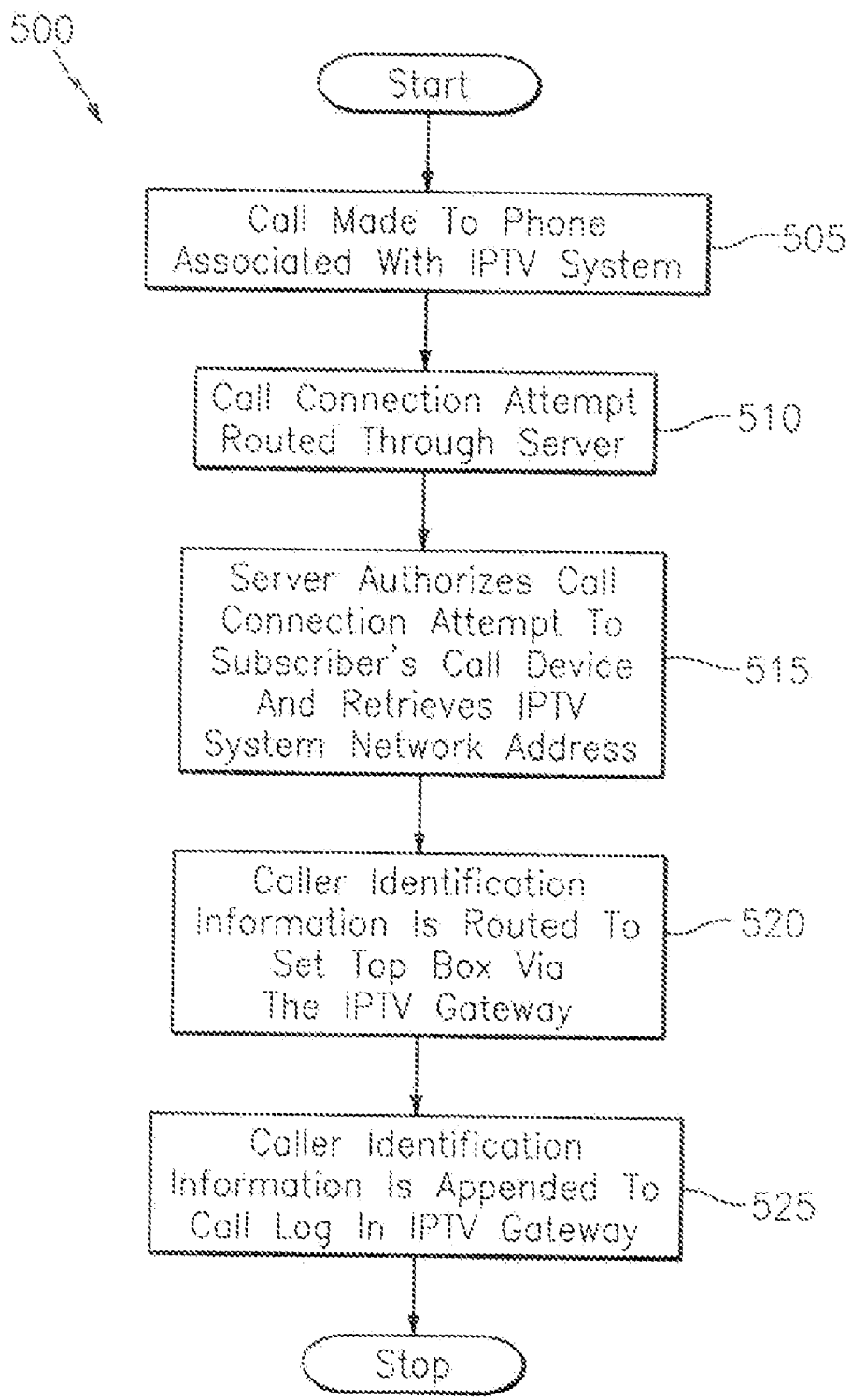
FIG. 5 illustrates an IPTV incoming call logging method in accordance with exemplary embodiments.

When the call is made at step 5, the incoming call is further logged in the IPTV call log 111 at step 70 (see FIG. 5). As discussed above, when the calling party identification information is transmitted over a data network (e.g., the IPTV infrastructure 200) via the IPTV gateway 250 to the IPTV-enabled communications device assigned to the IPTV address (e.g., communications device 106), the party identification information, is further logged into the call log 111 on the IPTV gateway 250. It is appreciated that the call log 111 may further reside on the set top box 110, or the controller server 125. As discussed further below, the calling party identification information may be transmitted to the set top box 110 of the IPTV-enabled communications device 106 using, e.g., UDP/HTTP protocols, where the calling party identification information is logged at step 70.

If the subscriber answers the phone call at step 15, the flow ends. It is appreciated that the display of the caller identification information on the communications device 106 allows the subscriber to know who is placing the phone call, and thus can make a decision to answer the phone or not. If the subscriber does not take the phone call at step 15, then at step 20 the method 2 determines whether or not the caller leaves a voicemail. If the caller does not leave a voicemail at step 20, then the flow ends. If the caller does leave a voicemail at step 20, then the voicemail is recorded in the voicemail infrastructure 165 at step 25 in accordance with voicemail systems and methods known in the art. At step 30 (see FIGS. 4A and 8A), in accordance with exemplary embodiments, the voicemail infrastructure 165 informs the email server 160 that a voicemail is left. The email server 160 then sends a message to the IPTV gateway 250, which sends a voicemail indication to the set top box 110 via the IPTV infrastructure 300 at step 30. In one exemplary implementation, the voicemail indication is a text message sent to the communications device 106 indicating that a voicemail is in the process of being left. In another exemplary implementation, another indication is a message indicating that a voicemail has been left. In the aforementioned exemplary implementations, the message can be displayed on the communications device 106, but does not persist. It is appreciated that such a non-persistent message can be desirable so that the message does not interfere with the subscriber's viewing ability. However, in another exemplary implementation, a persistent message waiting indication can be displayed on the communications device. The persistent message can be in the form of an icon or other indicator on a portion of the communications device 106 display in an area away from a main viewing area.

At step 35, it is determined whether or not the subscriber listens to the voicemail which can be from the call log 111, after the voicemail has been left, etc. If the subscriber does not choose to listen to the voicemail at step 35, then the flow ends. If the subscriber chooses to listen to the voicemail at step 35 when the subscriber receives an indication that the voicemail is in the process of being left, then the subscriber can also monitor the voicemail (see FIG. 4G). Regardless of how the subscriber listens to the voicemail, the voicemail is delivered to the media server 131 and ultimately to the subscriber location 105 for rendering on the communications device 106 at step 45. In exemplary embodiments, the voicemail can be left in the voicemail infrastructure 165 as a .wav file. The IPTV gateway 250 can coordinate the transfer of the voicemail file for translation to a .wma format in the media encoder 135. The media server 131 can then send the voicemail through the IPTV gateway 250 and the IPTV infrastructure 200 to the set top box 110 so that the subscriber can listen to the voicemail on the communications device 106.

Regardless of how the subscriber has handled the call, that is, by either not taking the call at step 15, listening to the voicemail or not listening to the voicemail at step 35, the call is logged into the call log 111 at step 70, as described above. The subscriber can use one of the subscriber call devices 107, 108 to return the phone call (and listen to the voicemail through the call log 111). In exemplary embodiments, the subscriber can also use the IPTV call log 111 to return the phone call. Therefore, at step 50, if the subscriber does not return the phone call, the flow ends. If the subscriber does return the phone call via the IPTV call log 111 at step 50, then the phone call is placed via the IPTV call log 111 at step 60 (see FIG. 6), and the call is logged as an outgoing call In the IPTV call log 111 at step 65.

As discussed above, it is appreciated that the method 2 of FIG. 2 illustrates an overview of the IPTV converged services methods implemented in the system 100 as described herein. Further details of the exemplary voicemail management via IPTV, call placement/return via the IPTV call log 111, incoming and outgoing call logging, voicemail monitoring, and message waiting indication methods are now described.

Figure 3A:
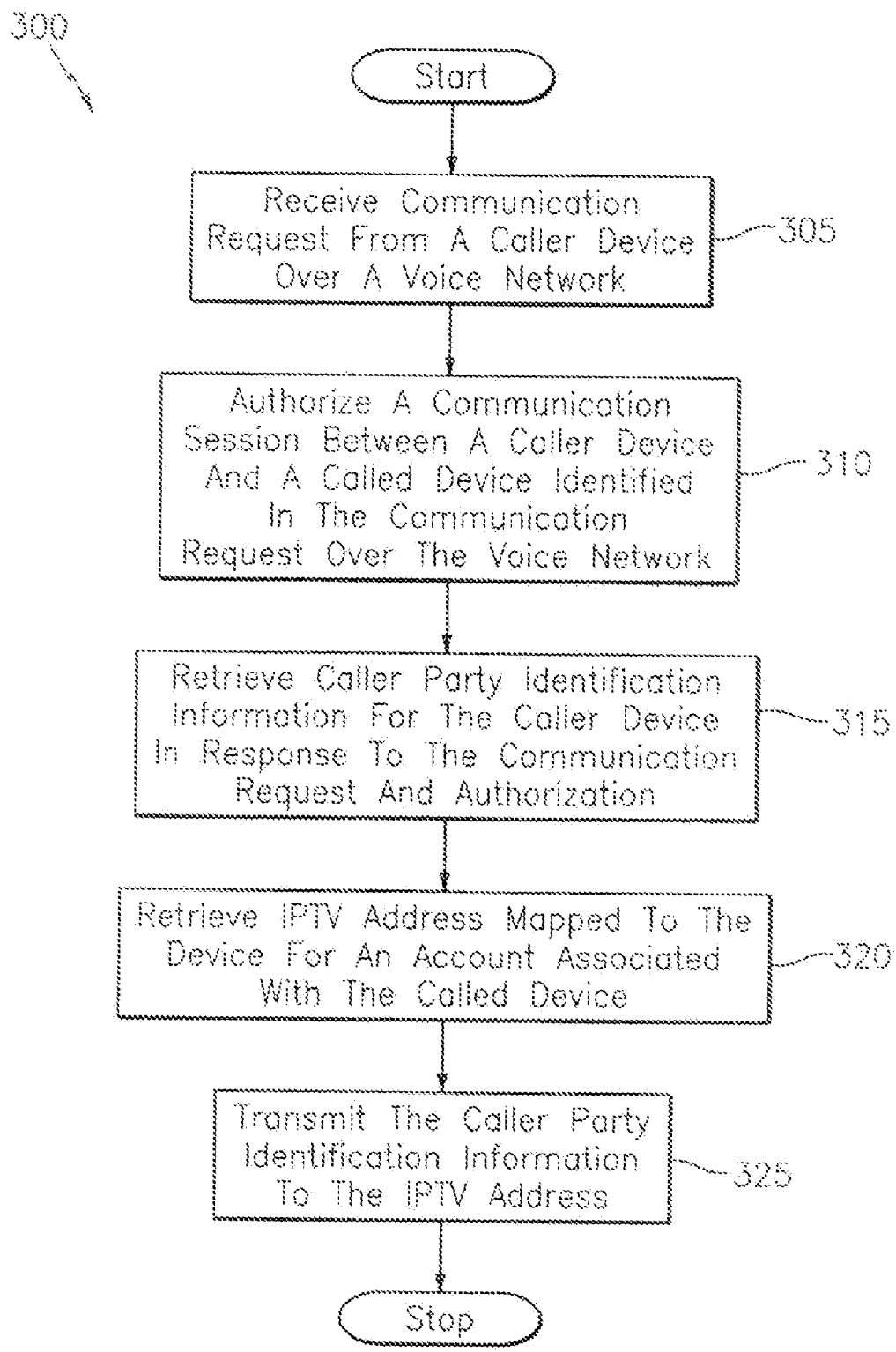
FIG. 3A illustrates an IPTV caller identification management method in accordance with exemplary embodiments.

FIG. 3A illustrates an IPTV caller identification management method 300 in accordance with exemplary embodiments. As discussed above, a communication is initiated by the external call device 141 over a voice network (e.g., the PSTN 140). A central office switch or SSP of the PSTN 140 receives the communication (e.g., communication signaling), resulting in a termination attempt trigger. The trigger causes a communication request to proceed over the SS7 network 145 via, e.g., a signal transfer point (STP). At step 305, the communication request is received at the controller server 125. The communication request includes call-related information, e.g., called party number (e.g., a number assigned with the subscribers call device 107, 108) and the caller party number. The SPA application 126 authorizes a communication session between the subscriber's call device 107 and the external call device 141 via a return reply (e.g., termination authorization signal) over the signaling network (e.g., the SS7 network 145) at step 310. At the same time, caller identification database 127 is searched for calling party identification information (e.g., caller name).

At step 315, the calling party identification information is retrieved from the database 127. The SPA application 126 searches the IPTV database 128 for the called party number. The called party number may be used to map communications address information for devices, such as the subscriber's call devices 107, 108 and communications device 106. An IPTV address mapped to the called party number is retrieved at step 320. The IPTV address may be a uniform resource locator (URL), Internet address, or other type of address. At step 325, the calling party identification information is transmitted over the IPTV gateway 250 and the IPTV infrastructure 200 to the IPTV-enabled communications device assigned to the IPTV address (e.g., the communications device 106). In an exemplary implementation, TCP communication can be exchanged between the IPTV infrastructure 200 and the IPTV gateway 250 in order to coordinate transfer of the set top box 110 identification, for example. The calling party identification information may be transmitted to the set top box 110 of the IPTV-enabled communications device 106 using, e.g., UDP/HTTP protocols, where the calling party identification information is displayed or otherwise rendered on the IPTV device (e.g., the communications device 106). It is understood that the preferences server 211 may include information specifying which of several IPTV set top boxes, such as the set top box 110, have requested to receive caller information, and which have not. The preferences server 211 may further include set top preferences for display on the communications device 106 and exchange of caller ID information, etc. The caller identification services described above may be modified or adapted to varying communication networks. It is further appreciated that the methods described herein provide an identification message and corresponding message indication whether the subscriber is receiving a call via call waiting, for example.

Figure 3B:
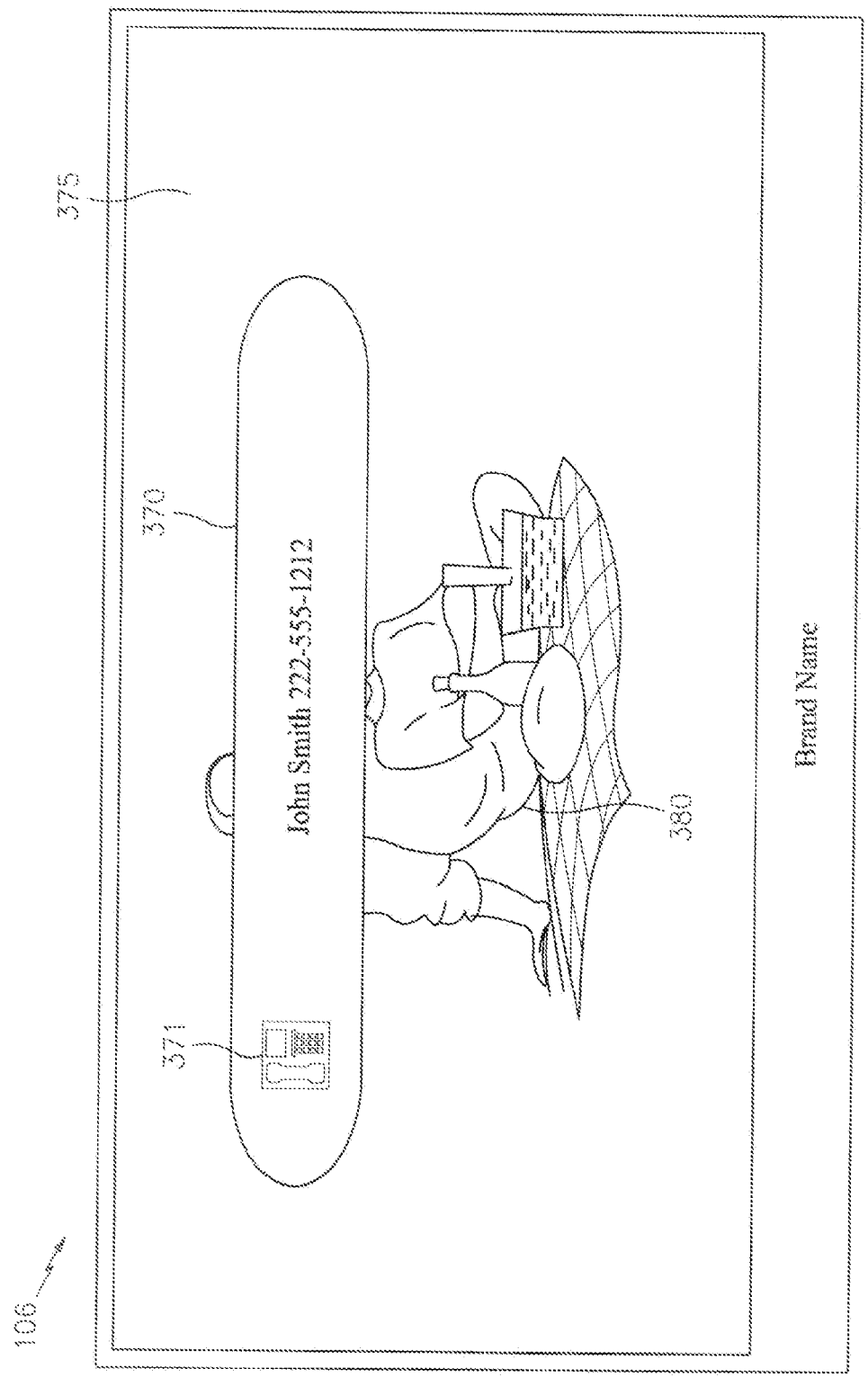
FIG. 3B illustrates an exemplary communications device displaying a caller identification message indication in accordance with exemplary embodiments.

FIG. 3B illustrates an exemplary embodiment of the communications device 106 displaying a caller identification message indication 370 in accordance with exemplary embodiments. It is now appreciated that when a subscriber receives a phone call as described above, the subscriber's call device 107 rings as described. In addition, the message is sent to the communications device 106 (e.g., an IPTV enabled television having a screen 375) and the message indication 370 is displayed on the screen, which can occur over normal programming content 380. In other exemplary embodiments, the message indication 370 can be displayed in other areas of the screen 375. As discussed above, in exemplary embodiments, the message indication 370 can be displayed for a short period of time and then be removed from the screen 375. In other exemplary embodiments, the caller identification message indication 370 can include an icon 371 representing a phone call. As illustrated, the default icon 371 can be displayed, which is illustrated as a telephone. However, the icon can be a unique representation related to the caller including, but not limited to, a picture, a video clip, a text clip, or a customized icon. The representation icon 371 can be stored locally such as on the subscriber's set top box 110, or alternatively, the representation can be linked to the caller identification information stored in the caller identification database 127.

In other exemplary embodiments, the icon 371 could be linked to an audio file that is unique to the caller such as a voice announcing the caller's name, which can be local to the subscriber location 105, such as residing on the set top box 110. Alternatively, the audio file could be coupled to the caller identification information stored in the caller identification database 127. In an exemplary implementation, the above-described audio file can be recorded by the caller in the same way that a caller announces a name and greeting when setting up a voicemail account, for example. The delivery of the representation to the subscriber's set top box 110 can be implemented in the same way that the caller identification information is delivered as described herein. The addition of video and audio is implemented as voicemail is delivered using the media server 131 as described below with respect to delivery of voicemail.

Figure 4A:
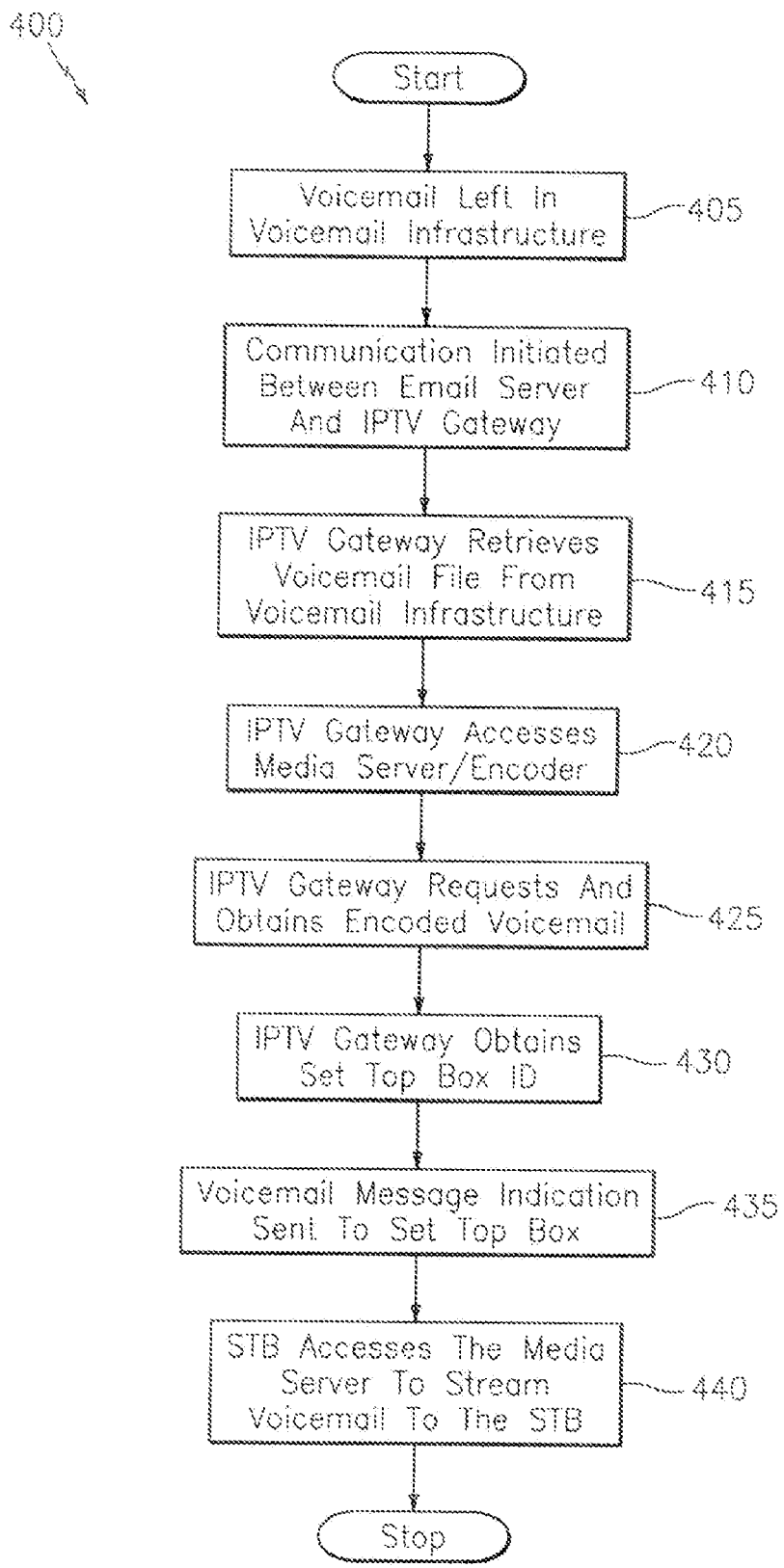
FIG. 4A illustrates an IPTV voicemail management method in accordance with exemplary embodiments.

FIG. 4A illustrates an IPTV voicemail management method 400 in accordance with exemplary embodiments. As discussed above, a voicemail can be left in the voicemail infrastructure 165 at step 405. When the voicemail is left in the voicemail infrastructure 165, the email server 160 is alerted thereby initiating a communication between the email server 160 and the IPTV gateway 250 at step 410. In another exemplary implementation, the IPTV gateway 250 can periodically access the voicemail infrastructure 165 to see if there has been a new voicemail deposited into the subscriber's voicemail account. At step 415, the IPTV gateway 250 retrieves the voicemail file from the voicemail infrastructure. In one exemplary implementation, the voicemail file can be in a .wav format. As such, at step 420 the IPTV gateway 250 accesses the media server 131 and the media encoder 135 in order to initiate an encoding session. In one exemplary implementation, the .wav voicemail file can be encoded into .wma format for streaming to the set top box 110. In turn, the media server 131 can store the encoded .wma file until the subscriber has decided to listen to the voicemail. Thus, at step 425, the IPTV gateway 250 requests and obtains the encoded file. At step 430, the IPTV gateway 250 communicates with the preferences server 211 to obtain the preferences, etc. In exemplary embodiments, the preferences server 211 stores preferences based on the set top box ID, and mapping between the IPTV account number and the set top box 110 is stored in the IPTV infrastructure 200. In an exemplary implementation, TCP communication can be exchanged between the preferences server 211 and the IPTV gateway 250 in order to coordinate transfer of the set top box 110 identification, the set top box 110 preferences for display on the communications device 106 and exchange of voicemail message indication, for example. The voicemail message indication (see FIG. 4B) may be transmitted to the set top box 110 of the IPTV-enabled communications device 106 using, e.g., UDP/HTTP protocols, where the voicemail message indication is displayed or otherwise rendered on the IPTV device at step 435. Then, at the subscriber's request, at step 440, the set top box 110 communicates with the media server 131 to stream the encoded voicemail to the set top box 110 for rendering on the communications device 106.

Figure 4B:
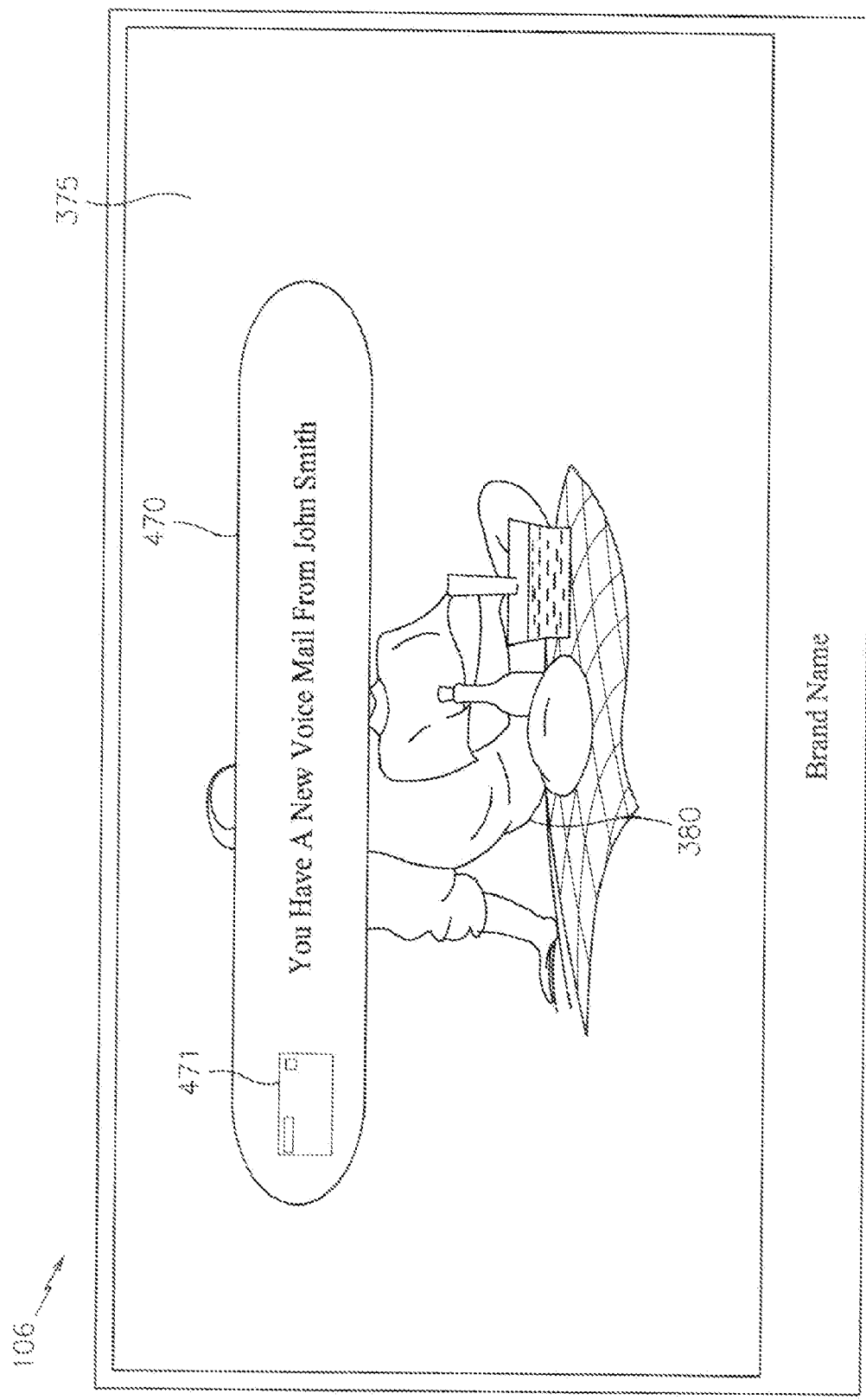
FIG. 4B illustrates an exemplary communications device displaying a voicemail message indication in accordance with exemplary embodiments.

FIG. 4B illustrates an exemplary embodiment of the communications device 106 displaying a voicemail message indication 470 in accordance with exemplary embodiments. It is now appreciated that when a subscriber receives a voicemail as described above, a message is sent to the communications device 106 (e.g., an IPTV enabled television having the screen 375) and the voicemail message indication 470 is displayed on the screen, which can occur over the normal programming content 380. In other exemplary embodiments, the message indication 470 can be displayed in other areas of the screen 375. As discussed above, in exemplary embodiments, the message indication 470 can be displayed for a short period of time and then be removed from the screen 375. In other exemplary embodiments, as described below with respect to FIGS. 8A-8D, a voicemail message indication can be displayed on the screen 375 that notifies the subscriber a voicemail is in the process of being left, at which time the subscriber can choose to monitor the voicemail. In other exemplary embodiments, the caller voicemail message indication 470 can include an icon 471 representing a voicemail. As illustrated, the default icon 471 can be displayed, which is illustrated as an envelope. However, the icon 471 can be a unique representation related to the caller, including, but not limited to, a picture, a video clip, a text clip, a customized icon, etc. The representation can be stored locally such as on the subscriber's set top box 110, or alternatively, the representation can be linked to the caller identification information, stored in the caller identification database 127.

In other exemplary embodiments, the icon 471 could be linked to an audio file that is unique to the caller such as a voice announcing the caller's name, which can be local to the subscriber location 105, such as residing on the set top box 110. Alternatively, the audio file could be coupled to the caller identification information stored in the caller identification database 127. In an exemplary implementation, the above-described audio file can be recorded by the caller in the same way that a caller announces a name and greeting when setting up a voicemail account, for example. In still other embodiments, the audio file can be a portion of the actual voicemail that was deposited. The delivery of the representation to the subscriber's set top box 110 can be implemented in the same way that the caller identification information is delivered as described herein. The addition of video and audio is implemented as voicemail is delivered using the media server 131 as described below with respect to delivery of voicemail.

Figure 4C:
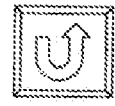
FIG. 4C illustrates an exemplary communications device displaying a electronic programming guide in accordance with exemplary embodiments.

When the subscriber desires to listen to the voicemail and the media server 131 begins streaming the voicemail file to the set top box 110, the subscriber can use the remote control 112 to navigate onscreen instructions on the communications device 106, which is now described. FIG. 4C illustrates an exemplary embodiment of the communications device 106 displaying an electronic programming guide (EPG) 475 on the screen 375. In exemplary embodiments, in order for the subscriber to initiate the streaming of the encoded voicemail message to the set top box 110, the subscriber can navigate the subscriber's EPG 475 using the remote control 112 to access menu entries that generate commands that notify the IPTV gateway 250 that playback of the voicemail file is desired. The EPG 475 can include various menu entries 476 that can be used to select channels for viewing. In accordance with exemplary embodiments, an additional menu entry 477 can be selected to enter a message center display 480. When the subscriber selects and enters the entry 477, the message center display 480 and entries from the call log 111 can be displayed.

Figure 4D:
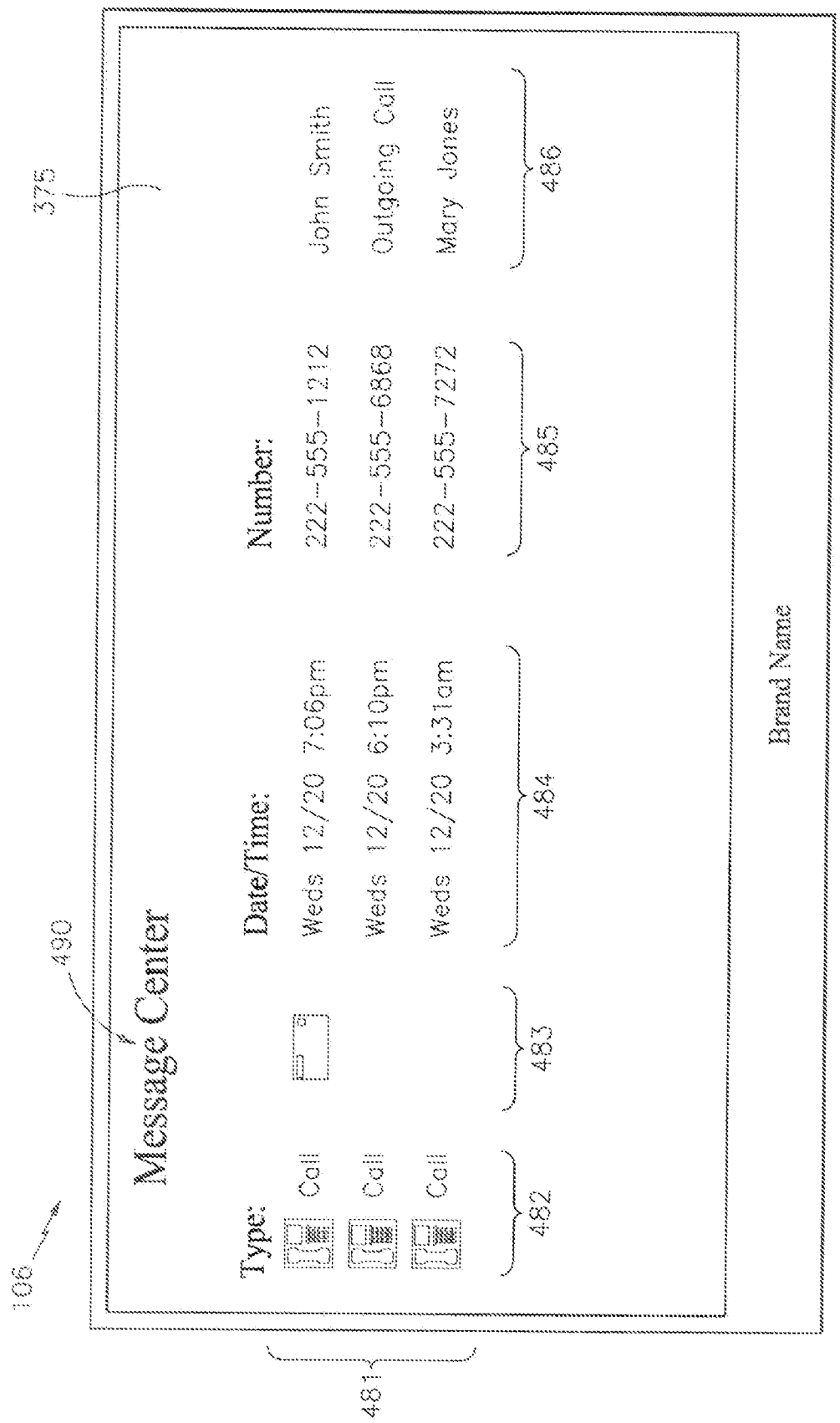
FIG. 4D illustrates an exemplary communications device displaying an exemplary message center display in accordance with exemplary embodiments.

FIG. 4D illustrates an exemplary embodiment of the communications device 106 displaying an exemplary embodiment of the message center display 480 having entries 481 associated with the call log 111. In exemplary embodiments, the call log entries 481 include a message type 482, which in this example is a "call" having a corresponding icon. The entries 481 can further include an iconic indication 483 of a voicemail, which in this example, is shown by the entry for "John Smith". The entries 481 can further include a date/time stamp 484, a phone number 485 and a name/call type 486, which can be an "Outgoing Call". In accordance with exemplary embodiments, the IPTV gateway 250 coordinates messages to the communications device 106 relating to the various entry indications. For example, when the IPTV gateway 250 retrieves caller identification information from the caller identification database 127, the IPTV gateway 250 coordinates transfer of the caller identification information for population of the entries 482, 483, 484, 485, 486. Furthermore, the IPTV gateway 250 tracks whether or not a call is incoming, or outgoing and thus coordinates the population of the entry 486 accordingly.

Figure 4E:
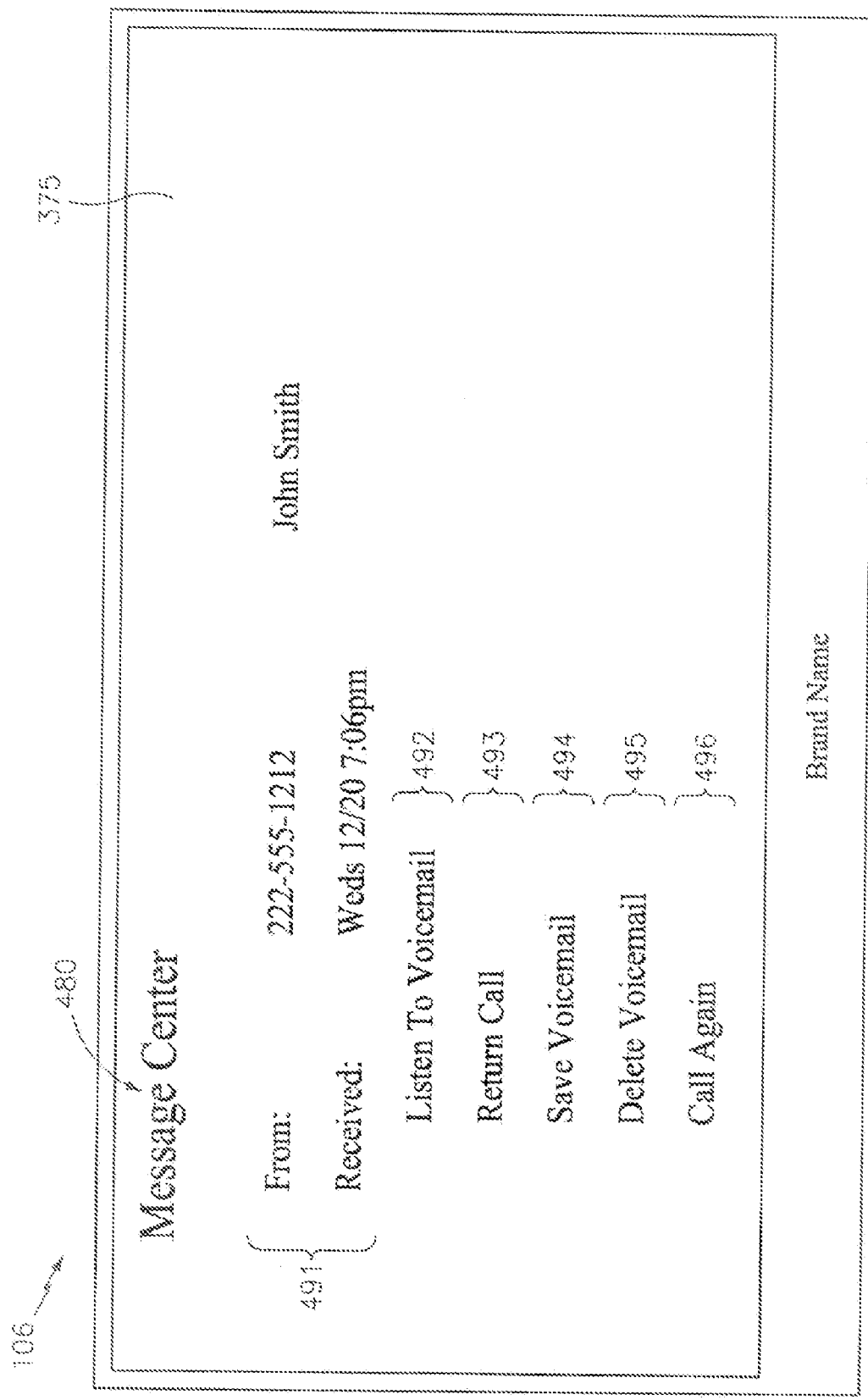
FIG. 4E illustrates an exemplary communications device displaying an exemplary message center display in accordance with exemplary embodiments.

Referring still to FIG. 4D, if the subscriber uses the remote control 112 to navigate on one of the entries 481 and chooses the "John Smith" entry, for example, which includes a voicemail, then the subscriber is navigated to another message center display 490. FIG. 4E illustrates an exemplary embodiment of the communications device 106 displaying an exemplary embodiment of the message center display 480 on the screen 375. The message center display 480 can include menu lines 491 for displaying the caller identification information and other demographic information such as the date of receipt of the voicemail. The message center display 480 can further include a menu entry 492 for listening to the voicemail and another menu entry 493 for returning the phone call, which is described in greater detail below with respect to FIG. 6. The subscriber can highlight the desired entry indicating a desired action to initiate, in this case to listen to the voicemail which generates the command to the media server 131 to stream the voicemail to the set top box 110 for play back on the communications device 106. Once the menu entry 492 is selected, the voicemail is then played on the communications device 106. In exemplary implementations, various other non-persistent messages such as "Retrieving Voice Mail . . . ", "Playing Voice Mail . . . ", "Finished Playing Voice Mail" can be displayed on the screen 375 to alert the subscriber of the status of the voicemail playback. The delivery of the message is performed in accordance with the embodiments described herein.

It is thus appreciated that a party can generate a telephone call to an IPTV subscriber triggering a trigger termination trigger (TAT) and a pop-up on the communications device screen 375 indicating an incoming call. If the subscriber chooses not to take the phone call, the call is transferred to the subscriber's voicemail, where the incoming caller deposits a voice message into the voicemail infrastructure 165. The voicemail infrastructure 165 establishes a connection to the email server 160 and sends a message (e.g., a SMTP message) to a pre-defined email account containing an Automatic Number Identification (ANI), or calling party telephone number, called party. Message ID, and, in one implementation, the voice message.

The destination email account is forwarded to a general IPTV email account, which is reviewed frequently for email and voicemail notifications, in one exemplary implementation, when a voicemail notification is detected, the IPTV gateway 250 extracts the voice mailbox number and connects to the voicemail infrastructure 165 via secure shell "ssh" protocol and starts an imap4 session. During the imap4 session specific commands are executed to log into the specified mailbox, extract the available message envelope, flags, and specific voice message (which is a base64 .wav format), log out of the voice mailbox, and exit, the imap4 session, according to exemplary embodiments. The voice message is then back to one of the IPTV gateway 250.

In one exemplary implementation, the IPTV gateway 250 sends the .wav formatted file to the media encoder 135 to convert the file to a Windows® Advanced Systems Format (ASF) file. The ".asf" file is stored on the media server 131 and made available for streaming. The subscriber can then listen to the voicemail by accessing an application to launch the message center 480 on the subscriber's set top box 110.

Referring again to FIG. 4E, the message center 480 includes additional entries that indicate a desired action. The message center 480 can include a save voicemail entry 494, which, when selected, saves the voicemail in the voicemail infrastructure 165. Similarly, the message center 480 can include a delete voicemail entry 495, which, when selected, deletes the voicemail from the voicemail infrastructure 165. The return call entry 493 and a call again entry 496 can be selected by the subscriber in order to place a call via the IPTV call log 111 as described above with respect to FIG. 2 and further below with respect to FIG. 6. In exemplary embodiments, the message center display 480 can include or exclude any number of the entries 492, 493, 494, 495, 496 depending on how the call is logged and/or whether or not a voicemail is left. For example, if no voicemail is left in the voicemail infrastructure 165, then the message center display 480 does not include the listen to voicemail entry 492, the save voicemail entry 494, and the delete voicemail entry 495. Furthermore, if the call is logged as an incoming call, then the return call entry 493 is displayed on the message center display 480. In contrast, if the call is logged as an outgoing call, then the call again entry 496 is displayed on the message center 480. It is appreciated that the entries 492, 493, 494, 495, 496 can vary depending on how the call has been handled within the system 100. It is further appreciated that the entries are populated on the message center display 480 by the IPTV gateway 250, according to exemplary embodiments. In exemplary embodiments, when a voicemail is deleted from the call log 111, the voicemail is also deleted from the voicemail infrastructure 165. Similarly, if a voicemail is saved from the call log 111, the voicemail is saved in an archived location in the voicemail infrastructure 165.

Figure 4F:
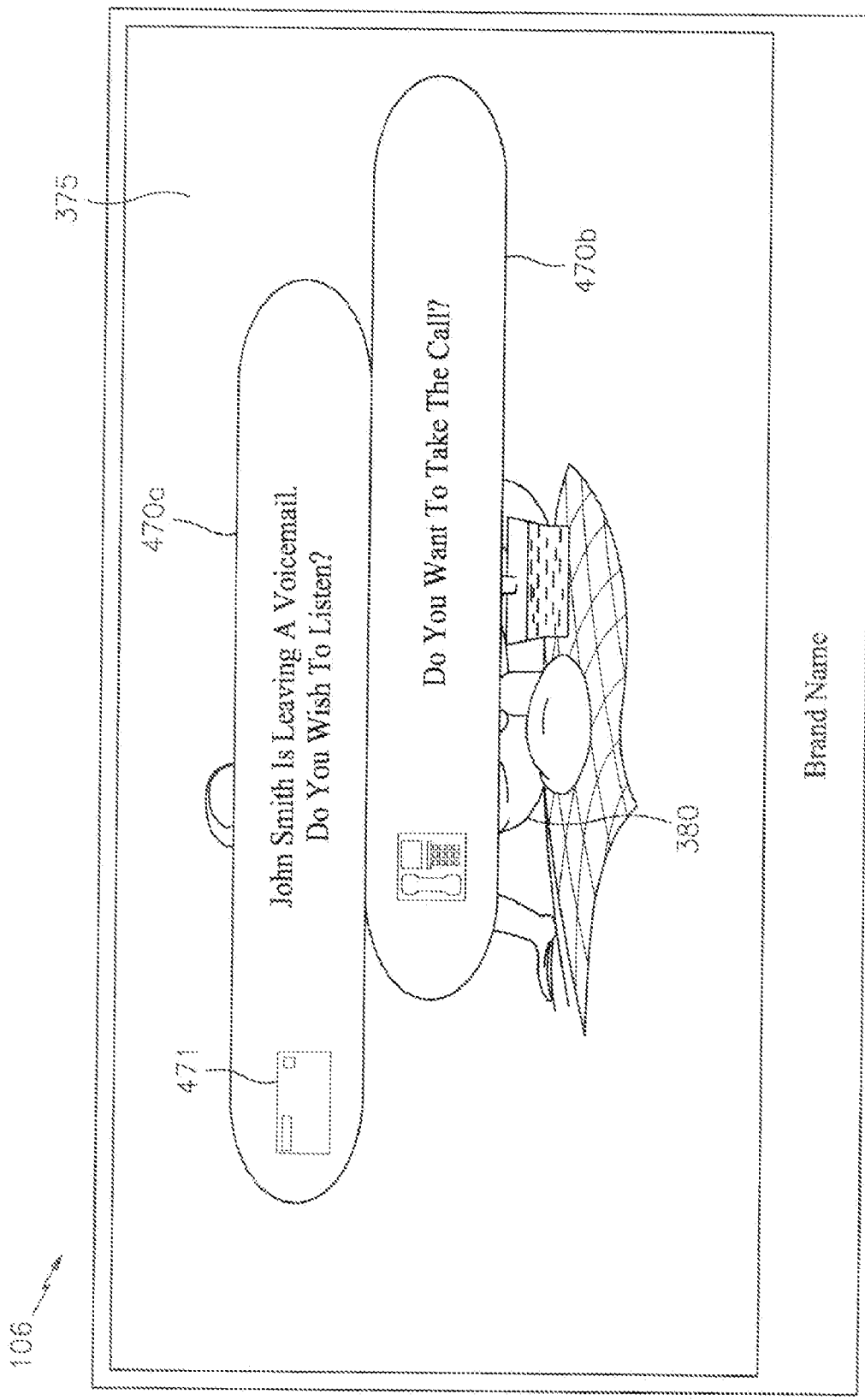
FIG. 4F Illustrates an exemplary communications device displaying voicemail message indications in accordance with exemplary embodiments.

Referring again to FIGS. 3B and 4B, the caller identification indication 370 and the voicemail message indication 470 can be displayed on the screen 375 to alert the subscriber of the receipt of a phone call and voicemail message, respectively. In other exemplary embodiments, the subscriber can receive an indication that the caller is in the process of leaving a voicemail. The subscriber can then choose to monitor the voicemail and optionally pick up the phone and speak to the caller while in the process of leaving the voicemail. FIG. 4F illustrates an exemplary embodiment of the communications device 106 displaying voicemail message indications 470a, 470b in accordance with exemplary embodiments. As discussed, the voicemail message indication 470a states that caller is in the process of leaving a voicemail. In exemplary embodiments, the subscriber can choose to listen to the voicemail by navigating the screen 375 with the remote control 112 in order to highlight the indication 470a and select the indication 470a to stream the voicemail to the set top box 110 and listen to the voicemail via the communications device 106 as the voicemail is being left. Furthermore, an additional message indication 470b can be displayed and subsequently selected by the subscriber, which asks the subscriber whether or not the subscriber would like to take the phone call.

Figure 4G:
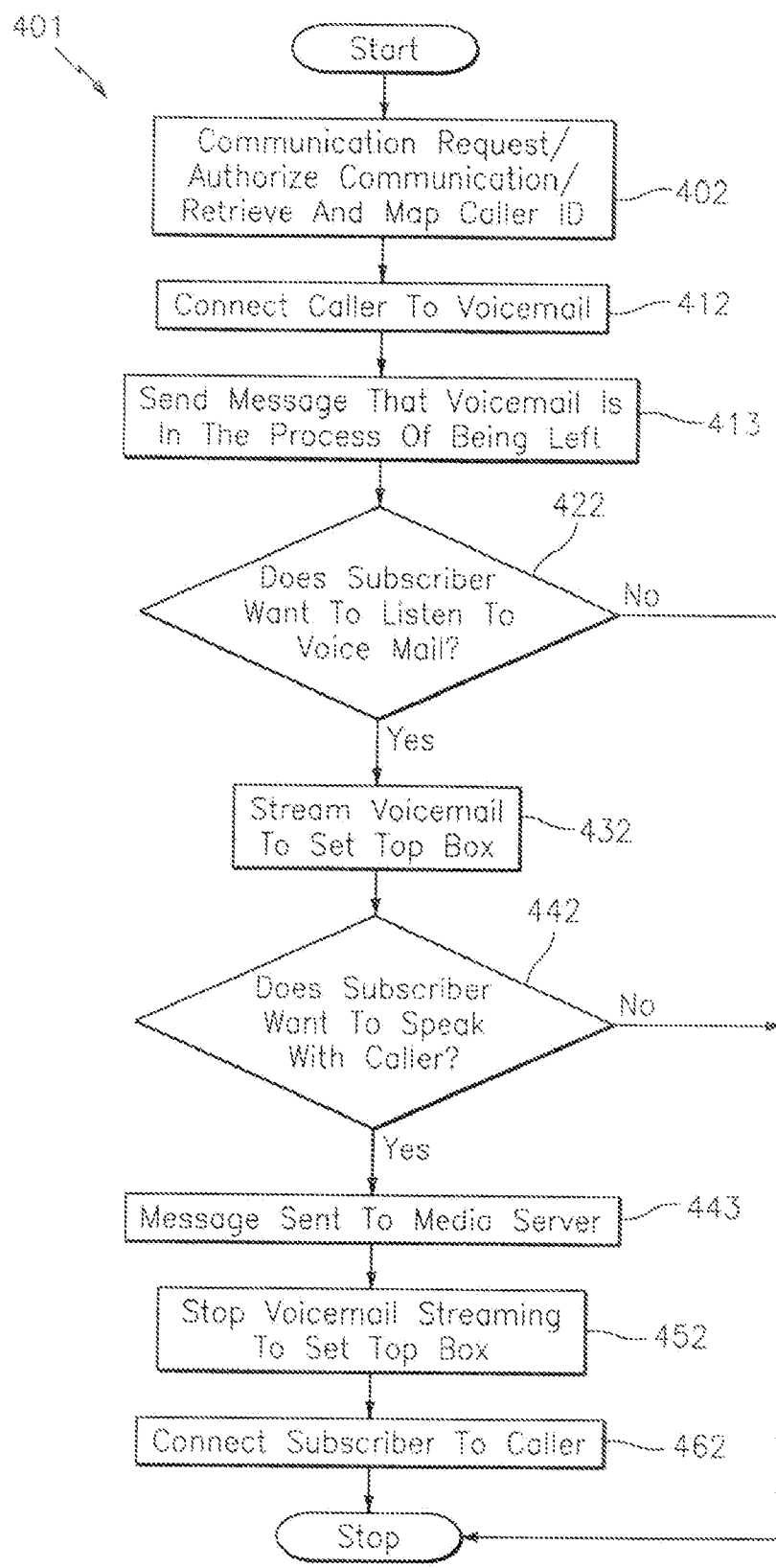
FIG. 4G illustrates an IPTV voicemail monitoring method in accordance with exemplary embodiments.

FIG. 4G illustrates an IPTV voicemail monitoring method 401 in accordance with exemplary embodiments. At step 402, as discussed above, the external call device 141 initiates a communication over a voice network (e.g., the PSTN 140). A central office switch or SSP of the PSTN 140 receives the communication (e.g., communication signaling), resulting in a termination attempt trigger. The trigger causes a communication request to proceed over the SS7 network 145 via, e.g., STP. The communication request is received at the controller server 125. The communication request includes call-related information, e.g., called party number (e.g., a number assigned with the subscribers call device 107, 108) and the caller party number. The SPA application 126 authorizes a communication session between the subscriber's call device 107 and the external call device 141 via a return reply (e.g., termination, authorization signal) over the signaling network (e.g., the SS7 network 145). At the same time, caller identification database 127 is searched for calling party identification information (e.g., caller name). The information is used to provide both a caller identification indication, such as the indication 370 and a voicemail being left indication, such as the indication 470.

At step 412, as discussed above, the caller is connected to the voicemail infrastructure 165. In an exemplary implementation, the SSP connects to the media server 131, which in turn, connects to the voicemail infrastructure 165. The media server 131 further routes the voicemail to the media encoder 135 and through the IPTV gateway 250 and IPTV infrastructure 200 to the set top box 110, where the voicemail is then available for monitoring. In addition, as described above, a message is sent to the set top box 110 that a voicemail is in the process of being left, at step 413. Therefore, at step 422, if the subscriber wants to listen to the voicemail, the voicemail is streamed to the set top box 110 at step 432. If at step 422, the subscriber does not want to monitor the voicemail, then the voicemail is deposited into the voicemail infrastructure 165 as discussed above, and the flow ends. The media server 131 can then tear down the connection to the set top box 110 and the voicemail can proceed to be deposited into the voicemail infrastructure 165.

In one exemplary implementation, the decision of the subscriber whether or not to monitor voicemail can be logged in the call log 111. For example, an additional indication can be included as an entry in the call log 111 to indicate, whether the subscriber monitored the voicemail or not, whether or not the subscriber took, the phone call while monitoring the voicemail, and the times of monitoring, as discussed further in the description below.

It is appreciated that the service node 130 routes the caller leaving the voicemail to multiple locations, that is, the voicemail infrastructure 165 and to the media encoder 135. In turn, the voicemail is sent to the media server 131, then ultimately to the set top box 110. In additional exemplary embodiments, the service node 130 can bridge the voicemail to additional endpoints such as other call devices (not shown). As such, multiple end devices can be bridged into the monitored voicemail. It is therefore appreciated that management rules regarding whom and under what circumstances the voicemail can be monitored can be implemented. In addition, as the voicemail is in the process of being monitored, the media server 131 can encrypt the voicemail as it is being streamed.

Referring still to FIG. 4G, as the voicemail is being streamed to the set top box 110 at step 432, the subscriber can elect to take the phone call. Therefore, at step 442, the method 401 determines whether or not the subscriber takes the phone call. If the subscriber decides to take the phone call at step 442, the subscriber can select the indication 470b using the remote control 112, which sends a message to the media server 131 at step 443 indicating that the subscriber does want to take the phone call. The service node 130 can then, in turn, bridges the phone calls as now described. In exemplary embodiments, the SPA application 132 is invoked to instruct the system 100 components to bridge the phone calls. As discussed above, the SPA application 132 can reside wholly on the controller server 125, partially on the controller server and the service node 130, or wholly on the media service node 130. The SPA application 132 then uses the subscriber call number to place a phone call to the subscriber via the PSTN 140. In an exemplary implementation, the subscriber's call device rings with a ring tone that is unique for calls placed to the subscriber by the SPA application 132 from the service node 130 to bridge the call to the calling party. In one exemplary implementation, the service node 130 implements primary rate interface (PRI) lines to route phones calls.

Once the subscriber indicates that the subscriber wants to take the phone call at step 442, the streaming ends at step 452 and the call is connected at step 462. In exemplary embodiments, once the subscriber picks up the subscriber call device 107, the two calls (i.e., the original call from the calling party and the call made to the subscriber from the service node 130) are immediately bridged. When the subscriber picks up the phone, the subscriber hears ringing associated with placing a phone call. Accordingly, the call is bridged to the external call device 141 that was used to place the original call to the subscriber. When the subscriber answers that first phone call, the call is bridged to the called party's call (already in progress to voicemail) and the call proceeds as a "normal" phone call. The calling party using the external call device 141 is then disconnected from the voicemail infrastructure 165 and connected to the subscriber call device 107. In exemplary embodiments, the service node 130 breaks down the connection to the voicemail infrastructure 165 and signals the SSP at the PSTN 140 that the calls are being connected.

In other exemplary embodiments, once the subscriber has elected to take the phone call at step 442, the service node 130 can bridge the phone call to another end device instead of the subscriber's call device 107. For example, the service node 130 can bridge the phone call directly to the set top box 110 and the phone call can proceed via the set top box 110 and the communications device 106.

Figure 4H:
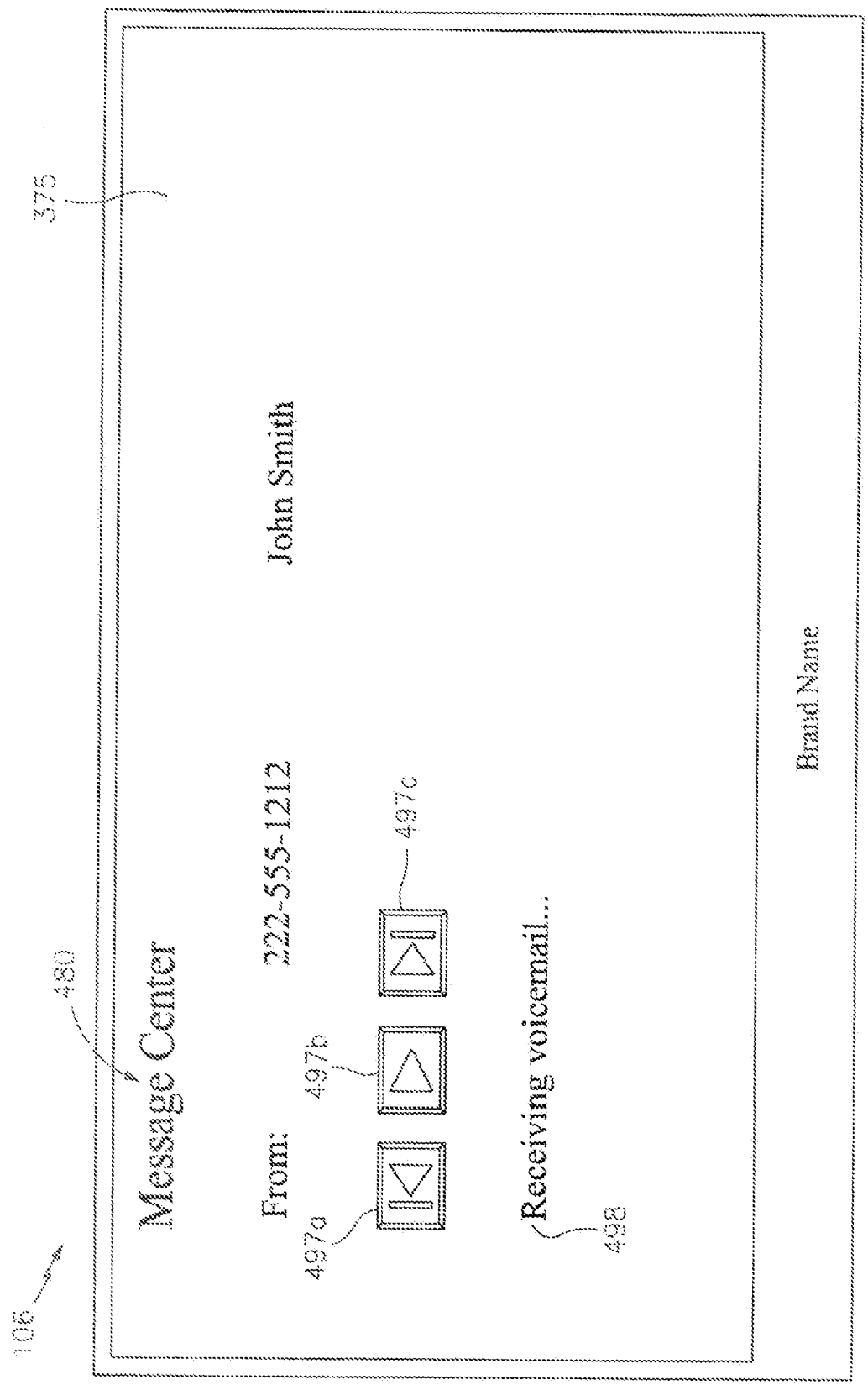
FIG. 4H illustrates an exemplary communications device displaying an exemplary voice mail monitoring control in accordance with exemplary embodiments.

It is appreciated that in other exemplary embodiments, the voicemail monitoring service can be implemented such that the media server 131 can prepare a phone call bridge based on the subscriber's decision. For example, when a caller identification indication (e.g., the caller identification indication 370 in FIG. 3B) is displayed on the screen 375, a further message can indicate "If The Caller Leaves A Voice Mail, Do You Want To Listen To It?" can be displayed. In this way, the subscriber can indicate whether or not the subscriber wants to listen to a voicemail prior to the voicemail being deposited into the voicemail infrastructure 165. In addition, this implementation allows the media server 131 to prepare a bridge if the calling party does begin to deposit a voicemail into the voicemail infrastructure 165. Therefore, once the voicemail is in the process of being deposited, the phone call can be bridged as discussed above. As such, the subscriber can avoid missing some of the voicemail while trying to make a decision whether or not to monitor the voicemail as the voicemail is in progress. If however, the subscriber chooses to decide to listen to the voicemail as the voicemail is being left or has elected to listen to a voicemail if left, but has missed a portion of the voicemail, in other exemplary embodiments, the subscriber can have control of rewinding or forwarding along the streamed voicemail message. For example, FIG. 4H illustrates an exemplary embodiment of the communications device 106 displaying voice mail monitoring controls 497a, 497b, 497c in accordance with exemplary embodiments. The "back" control 497a can be selected by the subscriber using the remote control 112 in order to back up the streamed voicemail in order to listen to a portion of the voicemail that the subscriber did not hear. The "forward" control 497c can be selected by the subscriber using the remote control 112 in order to forward the streamed voicemail. The "play" control 497b can be selected by the subscriber in order to play the desired portion of the voicemail. A voicemail indication message 498 can also be displayed giving the current status of the voicemail, such as, but not limited to "receiving voicemail" or "voicemail ended". In this way, the subscriber has control of monitoring the voicemail during the time in which the calling party is depositing the voicemail. It is appreciated that in exemplary embodiments, the subscriber is controlling the actual voicemail stream from the media server 131. In other exemplary embodiments, the set top box 110 can include a local cache (not shown) for receiving the streamed voicemail. As such, the subscriber can implement the controls 497a, 497b, 497c, to control, the voicemail as deposited into the cache on the set top box 110.

In the embodiments described above, the phone calls into and out of the subscriber location 105 can be logged. Referring again, to FIG. 4D, the entries 481 from the IPTV call log 111 are displayed. In exemplary embodiments, both incoming and outgoing calls are logged into the call log 111. Referring again to FIG. 2, incoming calls are logged into the call log 111 at step 70. FIG. 5 illustrates an IPTV incoming call logging method in accordance with exemplary embodiments. At step 505, a call is made from the external call device 141. As described above, a central office switch or SSP of the PSTN 140 receives the communication (e.g., communication signaling), resulting in a termination attempt trigger. The trigger causes a communication request to proceed over the SS7 network 145 via, e.g., a signal transfer point (STP). The communication, request is received at the controller server 125 at step 510. At step 515, the controller server 125 authorizes the call connection attempt to the subscribers call device 107. Concurrently, the server 125 retrieves the IPTV network address associated with the IPTV system device (e.g., the set top box 110) from the IPTV database 128. At step 520, the caller identification information is routed to the set top box 110 via the IPTV gateway 250 and the IPTV infrastructure 200. At step 525, the caller identification information is appended to the call log 111 residing on the IPTV gateway 250, (or the controller server 125). As discussed above, the subscriber can then access the call log 111 via the communications device 106 and navigate the call log entries 481 from the message center display 480 (see FIG. 4D).

Figure 6:
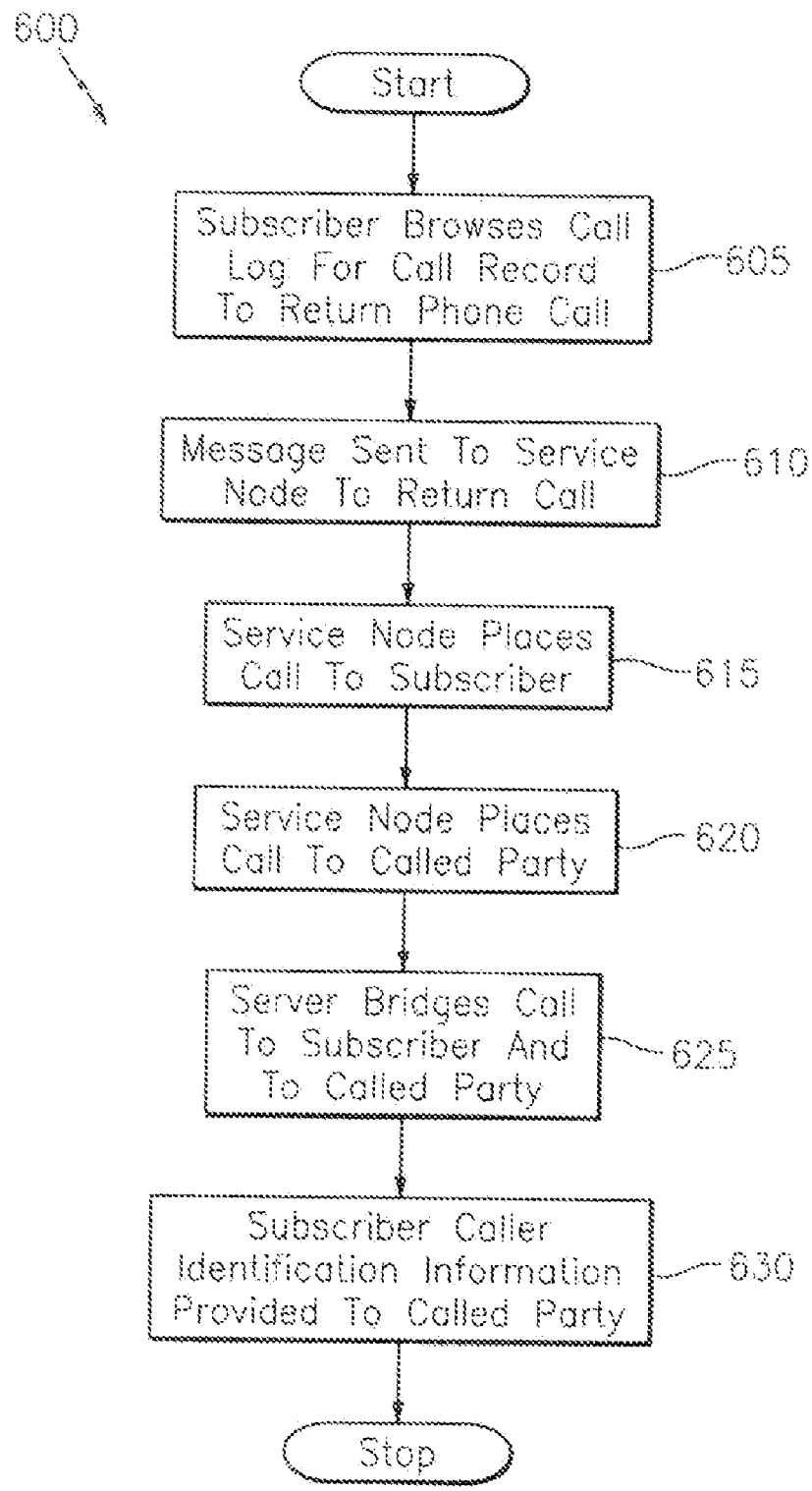
FIG. 6 illustrates an IPTV call return method, in accordance with exemplary embodiments.

In exemplary embodiments, referring again to FIG. 2, the subscriber can also return a phone call via the IPTV call log 111 at step 60. FIG. 6 illustrates an IPTV call return method 600 in accordance with exemplary embodiments. At step 605, the subscriber can browse the call log 111 by using the remote control 112 to navigate through the call log entries 481 on the screen 375 of the communications device 106. As described above with respect to FIG. 4E, the subscriber can select the return call menu entry 493. Upon selection of the call return entry 493, at step 610, a message is generated via the IPTV Infrastructure 200 and IPTV gateway 250 in accordance with the methods described above to the controller server 125 indicating that the subscriber is invoking the call return via the IPTV call log 111 service. The SPA application 132 on the service node 130 is then invoked to implement the call return via IPTV call log service. The SPA application 132 on the service node 130 receives that call record and the subscriber caller identification information. In one exemplary implementation, the call record is sent to the SPA application 132 along with the message indicating that a call return via the IPTV call log 111 feature is being invoked. The message invoking the call return via IPTV call log service can further include the subscriber call information either included with the message or provided via pointer to the call identification database 127.

Referring still to FIG. 6, at steps 615 and 620, the SPA application 132 on the service node 130 places a call to both the subscriber call device 107 and the called party call device (e.g., the external call device 141). The SPA application 132 uses the subscriber call number and the called number to place two phone calls via the PSTN 140. In one exemplary implementation, the service node 130 can use two primary rate interface (PRI) lines to route the two phones calls. Once the two phone calls are placed, at step 625, the two calls are immediately bridged. In another exemplary implementation, the call is bridged when the subscriber picks up the subscriber call device 107 as described Immediately below. The first phone call is placed to the subscriber at the subscriber location 105 on the subscriber call device 107 associated with the subscriber's caller identification information. In an exemplary implementation, the subscriber's call device rings with a ring tone that is unique for calls placed to the subscriber by the SPA application 126 for call return via the IPTV call log 111 phone calls. When the subscriber picks up the phone, the subscriber hears ringing associated with placing a phone call under "normal" circumstances (e.g., the subscriber picking up the phone, hearing a dial tone, and dialing a number to the external call device 141). In turn, the call made to the external call device 141 by the service node 130 via the second PRI line (as discussed) is bridged to the phone call made via the first PRI line to the subscriber call, device 107. Accordingly, the call is placed to the external call device 141 that was used to place the original call to the subscriber. Since the subscriber caller identification information is retrieved, the external call device 141 thus receives the subscriber's caller identification information via the external caller device 141 corresponding caller identification equipment at step 630. It is thus appreciated that the IPTV call return via the IPTV call log 111 service allows the subscriber to search through the call log 111 on their communications device screen 375, select a call from the log entries 481 and place a return call to the corresponding number. The service first rings the subscriber's call device 107. When the subscriber answers that first phone call, the call is routed to the called party and the call proceeds as a "normal" phone call.

As discussed above with respect to FIG. 2, calls placed from the subscriber call device 107 can also be logged as outgoing calls at step 65. As such, in accordance with exemplary embodiments described herein, when the subscriber returns the phone call via the IPTV call log 111, as described immediately above, the call is logged as an outgoing call. It is appreciated that any phone call made from the subscriber location 105 (e.g., via the subscriber call device 107) is logged as an outgoing call in the IPTV call log 111.

Figure 7:
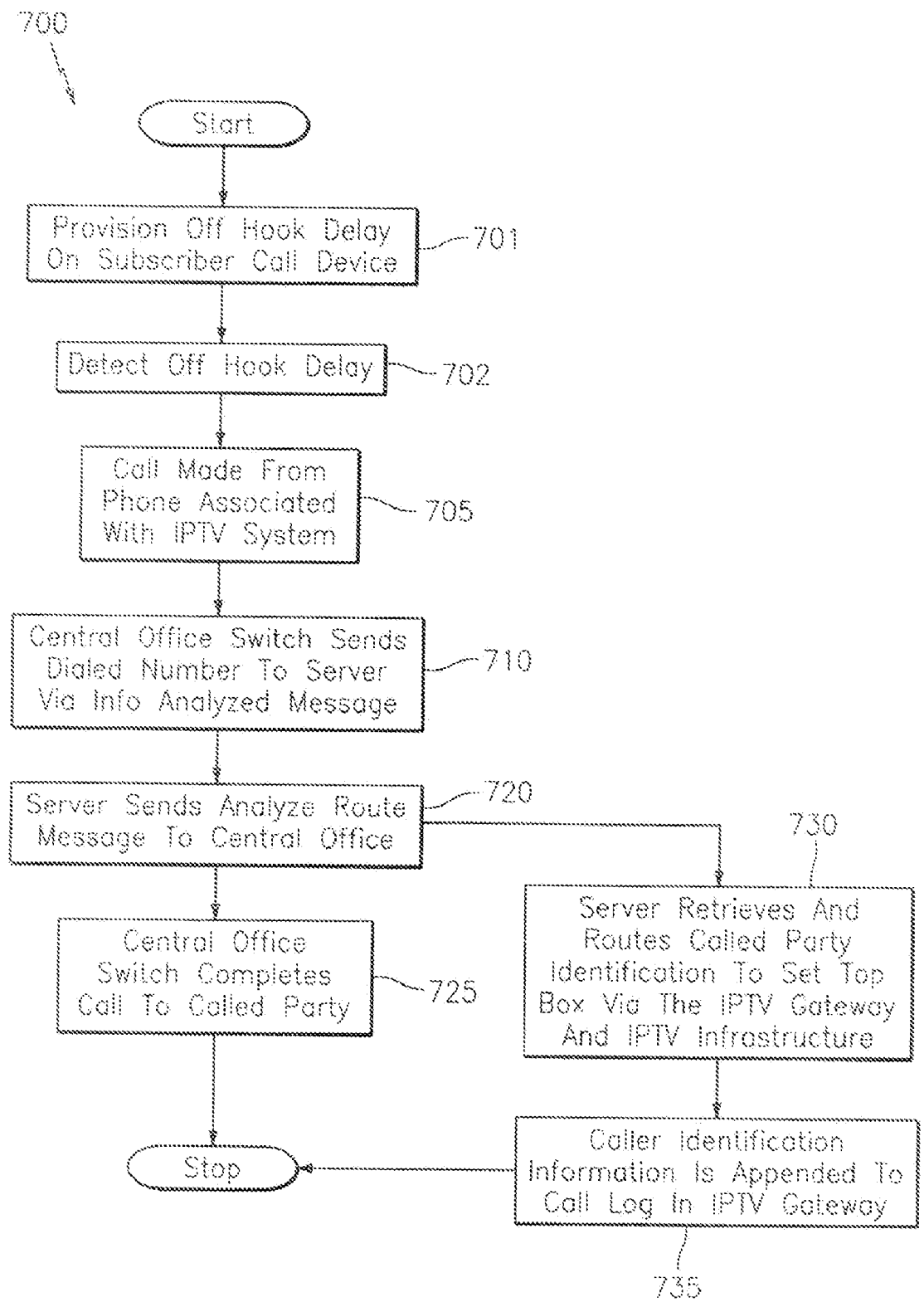
FIG. 7 illustrates an IPTV outgoing call logging method in accordance with exemplary embodiments.

FIG. 7 illustrates an IPTV outgoing call logging method 700 in accordance with exemplary embodiments. It is appreciated that an off hook delay trigger is initially placed on the subscriber line during provisioning at step 701. At step 702, the off hook delay trigger is detected. At step 705, the subscriber places a phone call using the subscriber call device 107. The subscriber can place the call in a variety of ways including placing a call via the IPTV call log 111 either by returning the call log or trying the call again, etc. The subscriber can also make an original phone call, that is, not using the IPTV call log 111, but rather by dialing the subscriber call device 107. Regardless of the way in which the subscriber places the call, the call can be logged as an outgoing call in the IPTV call log 111. As described above, a central office switch or SSP of the PSTN 140 receives the communication (e.g., communication signaling), resulting in a off hook delay trigger. The trigger causes a communication request to proceed over the SS7 network 145 via, e.g., a signal transfer point (STP). In turn, the PSTN 140 sends the dialed number to the controller server 125 at step 710, and the SPA application 126 processes the called number information. At step 720 the controller server 125 sends an "analyze route" message to the central office of the PSTN 140, which routes the call. At step 725, the central office of the PSTN 140 completes the call to the called party, generally to the external call device 141. The controller server 125 then retrieves the caller identification information (e.g., from the caller identification database 127) at step 730. At the same time, at step 730, the controller server 125 routes the caller identification information to the set top box 110 via the IPTV gateway 250 and IPTV infrastructure 200. In an exemplary implementation, the SPA application 126 sends a TCP/IP message to the IPTV gateway 250 containing the outgoing log commands, the caller identification information and the phrase "Outgoing Call" for display in the message center as illustrated in the name/call type 486 in FIG. 4D. In addition, the IPTV gateway 250 can send a phrase "Call Again" for display as the menu entry 496 in the message center 480 illustrated in FIG. 4E. In other exemplary embodiments, the IPTV gateway 250 can be implemented to do a query to the caller identification database 127 and place the name of the called party in the message instead of "Outgoing Call". Therefore, at step 735, the caller identification information is appended to the call log 111 on the set top box 110.

As discussed above, in exemplary embodiments, the caller identification indication 370 of FIG. 3B and the voicemail indication 470 of FIG. 4B can be non-persistent messages that pop up on the screen 375 and then disappear after a period of time to alert the subscriber as to incoming calls and voicemail messages. It is appreciated that the non-persistent manner in which the indications 370, 470 are displayed allow the subscriber to know that a call or voicemail has occurred, but without generally interfering with normal viewing of the program content 380 on the communications device 106. However, it is further appreciated that the subscriber may not remember that a call or voicemail occurred or may not see the indications 370, 470 if the subscriber was not viewing the screen 375 when the indication 370, 470 popped up. As such, in other exemplary embodiments, a persistent message waiting indication can further be displayed on the screen 375, thereby alerting the subscriber that calls and voicemails have occurred and have been previously displayed and can be represented as non-persistent indications, such as die indications 370, 470, on the screen 375.

Figure 8A:
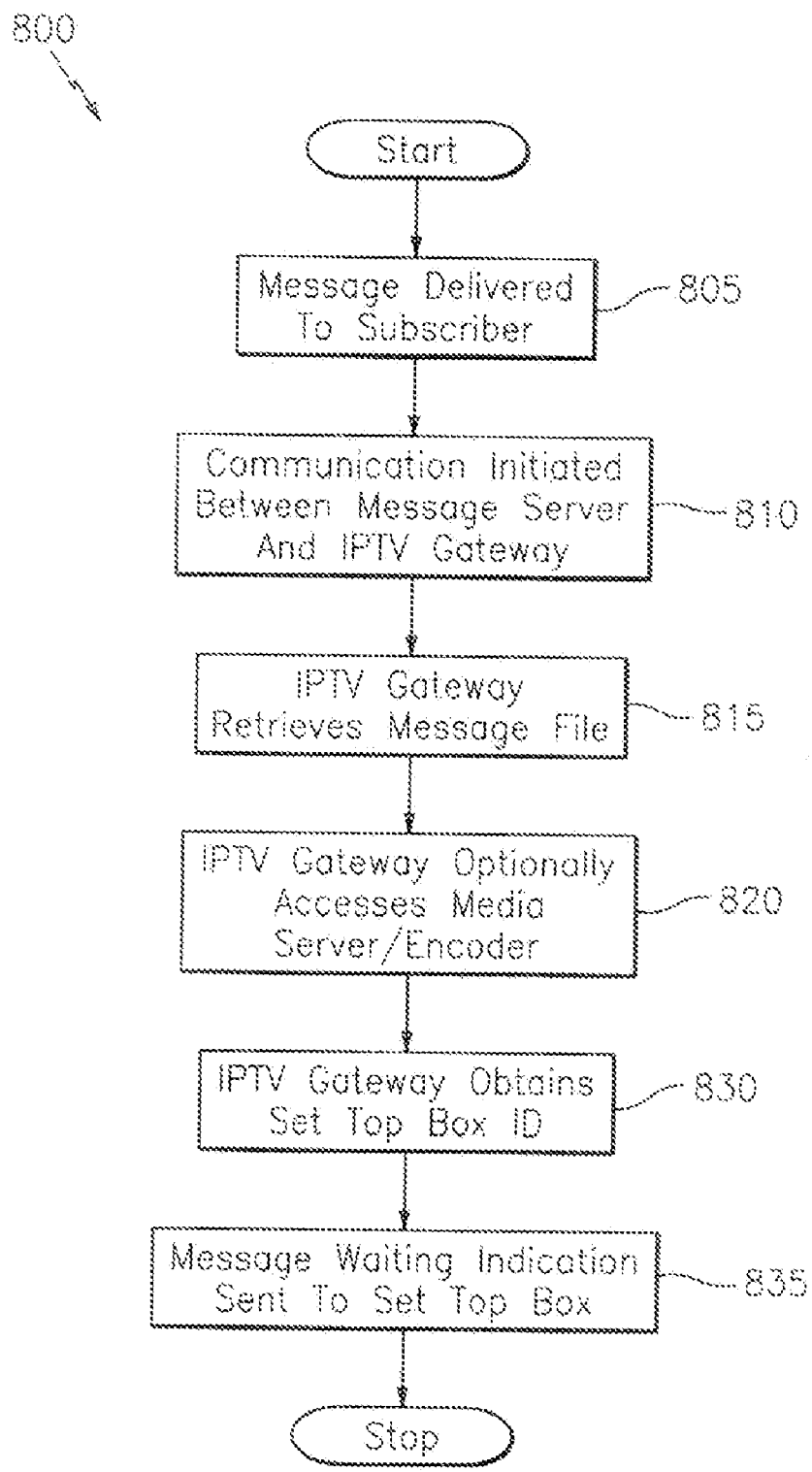
FIG. 8A illustrates an IPTV message-waiting indication method in accordance with exemplary embodiments.

FIG. 8A illustrates an IPTV message-waiting indication method 800 in accordance with exemplary embodiments. As discussed above, a voicemail can be left in the voicemail infrastructure 165 when a caller leaves a voicemail message. It is appreciated that in other exemplary embodiments, other message types can be deposited in other infrastructures that are network enabled and that can interface with the system 100. For example, emails can be sent to the subscriber computer 109 in accordance with other accounts that the subscriber may have and for which are stored in an accounts database and associated services provided via the IPTV gateway 250. As such, various types of messages can be delivered to the subscriber to any of the communications devices at the subscriber location 105, at step 805. When the message is left in the message infrastructure, such as the voicemail infrastructure 165, the message server, such as the email server 160, is alerted thereby initiating a communication between the message server and the IPTV gateway 250, at step 810. In another exemplary implementation, the IPTV gateway 250 can periodically access the message infrastructure (e.g., voicemail infrastructure 165) to query if there has been a new message deposited into the subscriber's account (e.g., voicemail account, email account, etc.). As discussed above, at step 815, the IPTV gateway 250 retrieves the message file from the message infrastructure. In one exemplary implementation, if the message is a voicemail, as discussed above, the voicemail file can be in a .wav format. As such, at step 820 the IPTV gateway 250 accesses the media server 131 and the media encoder 135 in order to initiate an encoding session, if necessary. At step 830, the IPTV gateway 250 communicates with the preferences server 211 to obtain the set top box 110 identification and set top box 110 preferences. In an exemplary implementation, TCP communication can be exchanged between the IPTV infrastructure 200 and the IPTV gateway 250 in order to coordinate transfer of the set top box 110 identification, set top box 110 preferences for display on the communications device 106, and exchange of message waiting indications, for example. The message waiting indication may be transmitted to the set top box 110 of the IPTV-enabled device (e.g., the communications device 106) using, e.g., UDP/HTTP protocols, where the message waiting indication is displayed or otherwise rendered on the communications device 106 at step 835.

As discussed above with respect to FIGS. 3B and 4B, a unique representation of the message sender (e.g., caller) can be sent with the caller identification indication 370 and the voicemail message indication 470 as the icons 371, 471. In exemplary embodiments, the same or similar indication can be used to display a persistent message waiting indication on the screen 375 of the communications device 106. The message waiting indication can be displayed on the screen 375 in a location that is evident to the subscriber but in an area that does not interfere with the normal viewing content 380 on the communications device 106.

Figure 8B:
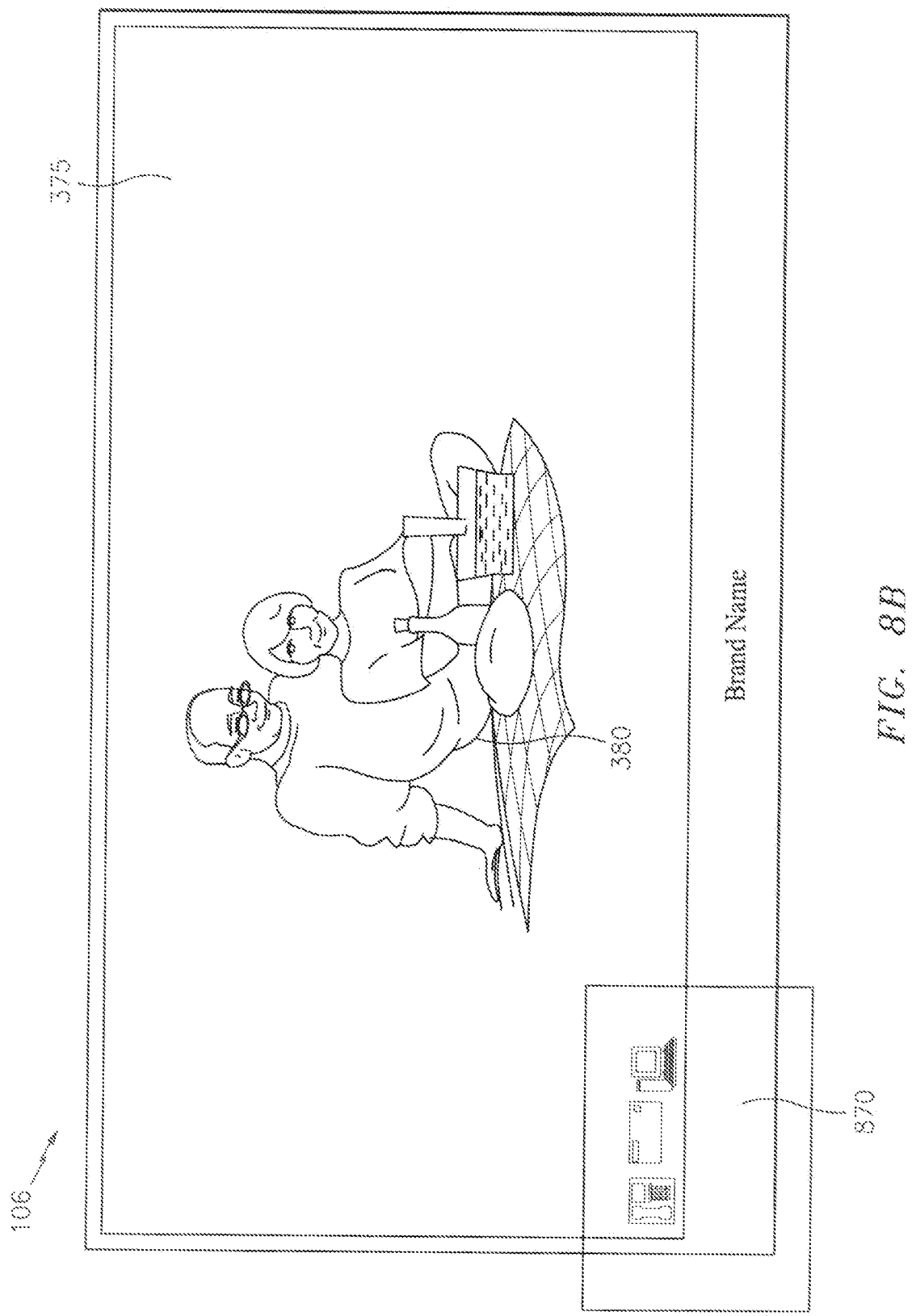
FIG. 8B illustrates an exemplary communications device displaying message waiting indications in accordance with exemplary embodiments.

FIG. 8B illustrates an exemplary embodiment of the communications device 106 displaying message waiting indications 870 in accordance with exemplary embodiments. As discussed above, the message waiting indications 870 can be one or more persistent icons that are displayed on the screen 375 of the communications device 106. The indications 870 can be a unique representation related to the caller, including, but not limited to, a picture, a video clip, a text clip, a customized icon, etc. The accompanying representation, if any, can be stored locally such as on the subscriber's set top box 110, or alternatively, the representation can be linked to the caller identification information stored in the caller identification database 127. In other exemplary embodiments, the indications 870 can be linked to an audio file that is unique to the caller such as a voice announcing the caller's name, which can be local to the subscriber location 105, such as residing on the set top box 110. Alternatively, the audio file could be coupled to the caller identification information stored in the caller identification database 127. The above-described audio file can be recorded by the caller in the same way that a caller announces a name and greeting when setting up a voicemail account, for example. In still other embodiments, the audio file can be a portion of the actual voicemail that was deposited. The delivery of the representation to the subscriber's set top box 110 can be implemented in accordance with exemplary embodiments as described with respect to the caller identification information as described herein. The addition of video and audio that is implemented as voicemail is delivered using the media server 131 as described above with respect to delivery of voicemail.

Figure 8C:
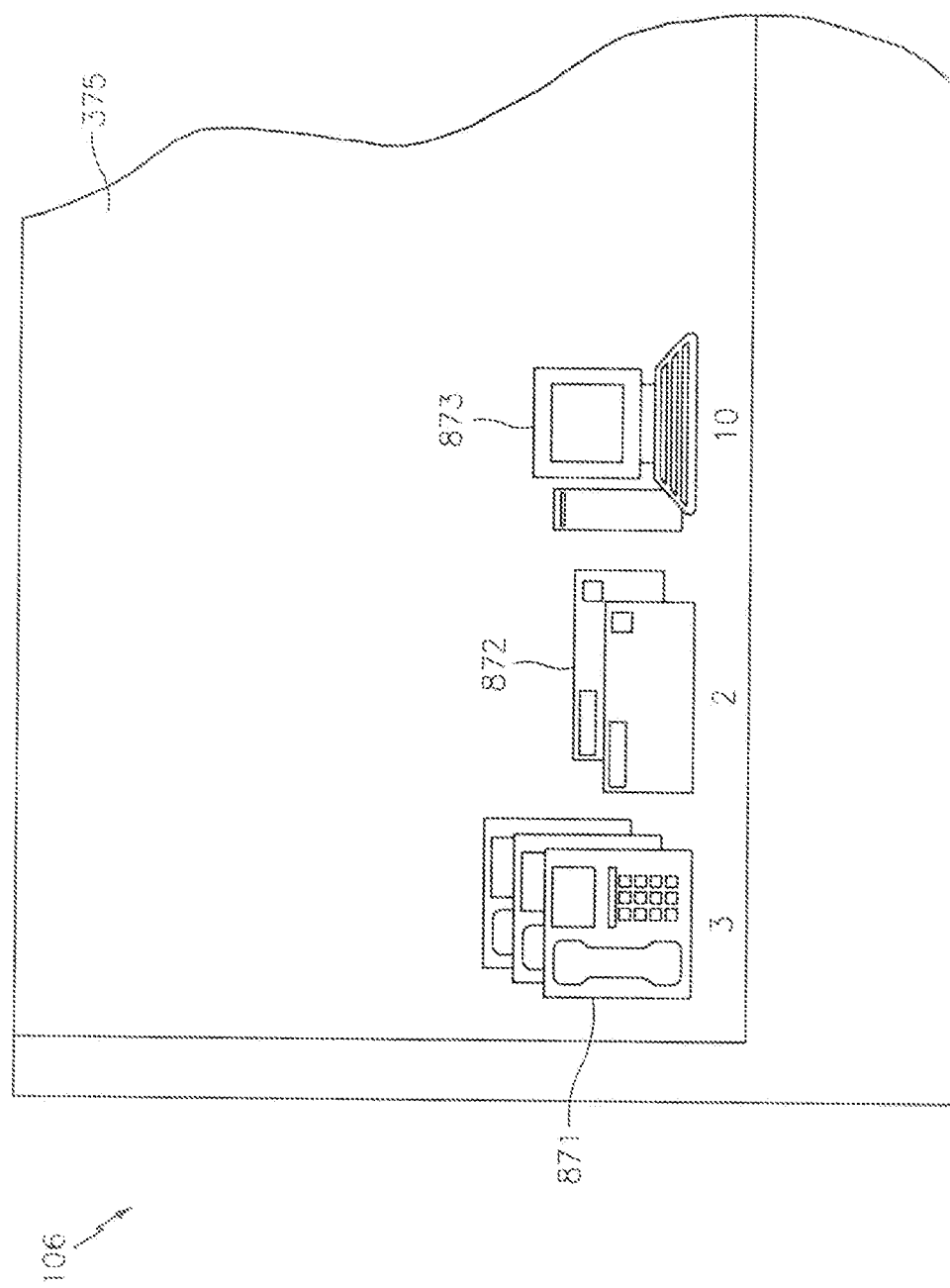
FIG. 8C illustrates an exemplary communications device having a close up view of message waiting indications in accordance with exemplary embodiments.

FIG. 8C illustrates an exemplary embodiment of the communications device 106 having a close-up view of the message waiting indications 870 which includes an icon 871, an icon 872, and an icon 873 in accordance with exemplary embodiments. For example, the message waiting indication 870 could include the icon 871 indicating the phone calls have been received. Furthermore, the icon 871 can be stacked indicating that there have been multiple phone calls received. For example, three of the phone icons 871 can be stacked. In another exemplary implementation, a single instance of the icon 871 can be displayed with the number "3" underneath the icon indicating that three phone calls have been received. Alternatively, as illustrated, the icons 871 can be stacked in combination with a number displaying the number of calls received. Similarly, the icon 872 can be displayed indicating that voicemails have been deposited in the voicemail infrastructure 165. For example, two of the envelope icons 872 can be stacked indicating that two voicemails are awaiting the subscriber. In another exemplary implementation, a single instance of the icon 872 can be displayed with the number "2" underneath the icon indicating that two voicemails have been deposited. Alternatively, as illustrated, the icons 872 can be stacked in combination with a number displaying the number of voicemails received. The icon 873 can further be displayed indicating emails have been received at the subscriber location 105, which can be at the subscriber computer 109 and/or the cellular phone 108. For example, ten of the computer icons 873 can be stacked indicating that ten emails have been received. In another exemplary implementation, a single instance of the Icon 873 can be displayed with the number "10" underneath the icon indicating that ten emails have been received (as illustrated).

Figure 8D:
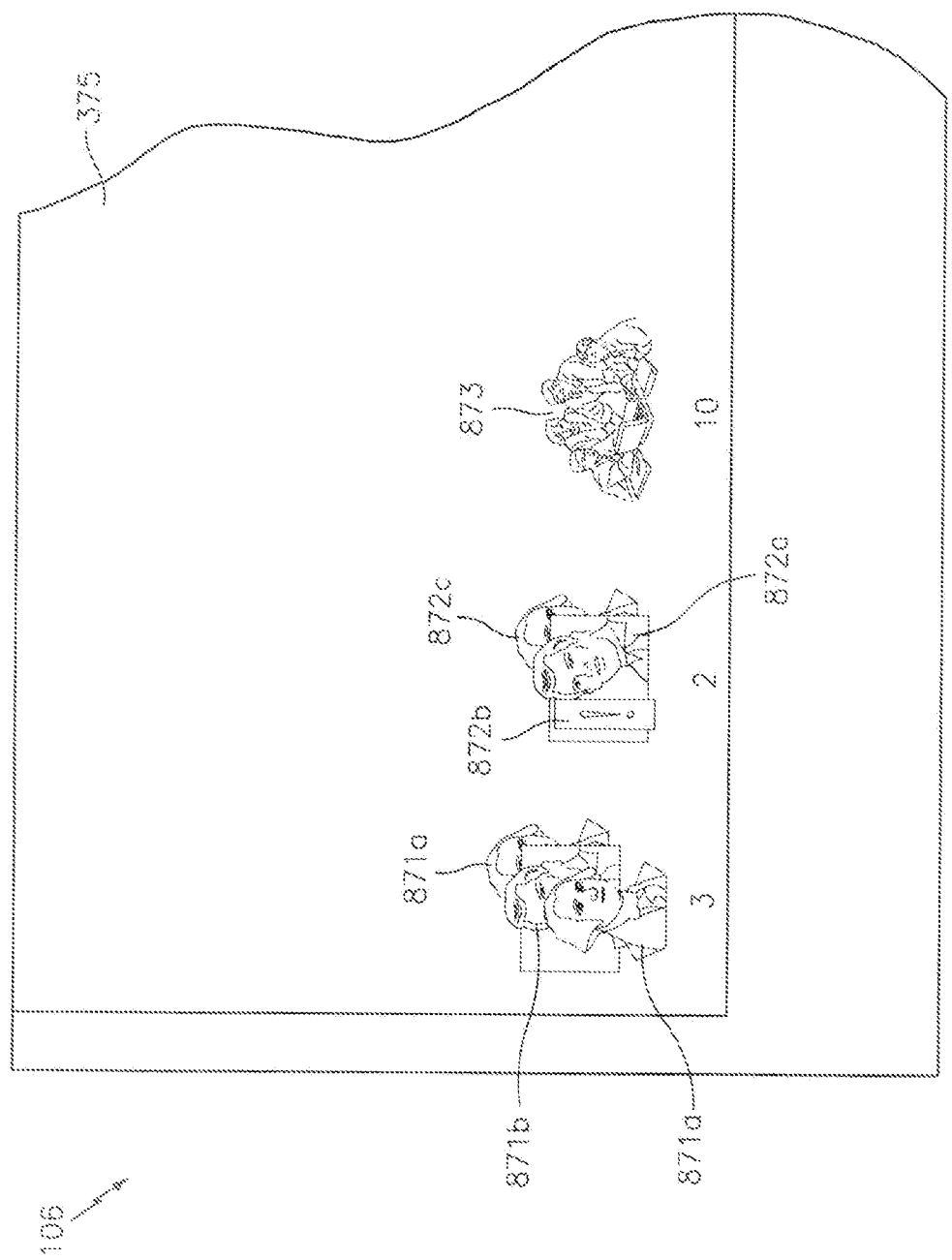
FIG. 8D illustrates an exemplary communications device having a close up view of message waiting indications in accordance with exemplary embodiments.

It is therefore appreciated that the message waiting indications 870 as described above provide a persistent indication and synopsis of calls, voicemails, emails and other message types that have been received at the subscriber location 105. FIG. 8C illustrates the same icon for a given message type. For example, the phone icon 871 is displayed for phone calls received, the envelope icon 872 is displayed for voicemails received and the computer icon 873 is displayed for emails received. However, the icons 871-873 can be further personalized and customized to indicate the source of the message. FIG. 8D illustrates an exemplary embodiment of the communications device 106 having a close up view of the message waiting icons 871, 872, 873 in accordance with exemplary embodiments. The message waiting icons 871, 872, 873 can further indicate additional features such as source, urgency, frequency, etc. For example, for the calls received a first icon 871*a* is displayed as having received two calls from the same source, and a second icon 871*b* is displayed indicating a single phone call from another source. In one exemplary implementation, the icons 871*a*, 871*b* are listed in the same order as they were received at the subscriber location 105. However, in another exemplary implementation, the icons 871*a*, 871*b* can be listed in an order of priority. For example, for voicemail, a first icon 872*a* is listed in front of a second icon 872*c*, the icons 872*a*, 872*c* in this example indicating voicemails from different sources. The first icon 872*a* includes a further message indication icon 872*b*, that is, an exclamation point in this example, indicating an urgency of the voicemail. As such, the icon 872*a*, having the urgency icon 872*b* attached to the icon 872*a*, can be placed at the forefront of the second icon 872*c* regardless of the order of receipt of the vote-email associated with the first icon 872*a*. A further unique icon, such as the icon 873, indicating, for example, the source being the workplace is further illustrated. It is appreciated that in other exemplary implementations, further indications can be included with the icons, including, but not limited to, source phone number for calls and voicemails, email addresses and subject lines for emails, etc.

In an exemplary implementation, the subscriber can use the remote control 112 to navigate the screen 375 to the message waiting indications 870 to highlight and select, the indications of interest to be navigated directly to the message center 480 as discussed above with respect to FIGS. 4D and 4E. It is therefore appreciated that the subscriber can navigate in multiple ways to the message center 480. As discussed with respect to FIGS. 4D and 4E, the subscriber can navigate to the message center 480 from the EPG 475, for example. In the examples discussed immediately above, the subscriber can alternatively navigate to the message center 480 via the message waiting indication icons 871-873.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can. also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for logging communication requests related to an internet protocol enabled television of a called party, the method comprising:
   receiving, by an internet protocol television gateway, a request to initiate a telephone call to a called party telephone number for a called party telephone, a set top box being associated with a device address that is mapped to the called party telephone number;
   retrieving, by the internet protocol television gateway, caller identification information associated with a calling party;
   recording the caller identification information in a call log stored on the internet protocol television gateway;
   wherein in an event the calling party is in a process of currently leaving a voicemail in a voicemail infrastructure associated with the internet protocol enabled television, the internet protocol television gateway permits a selectable option to display for the called party to listen to the calling party while the calling party is in the process of currently leaving the voicemail;
   in response to the called party initiating the selectable option, allowing via the internet protocol television gateway the called party to listen to the calling party while the calling party is in the process of currently leaving the voicemail; and
   storing in the call log stored on the internet protocol television gateway a decision of the called party to monitor the voicemail in the process of being left for the called party;
   wherein the call log stored on the internet protocol television gateway is configured to add an additional entry of whether the called party monitored the voicemail in the process of being left, whether the called party answered the telephone call while monitoring the voicemail in the process of being left, and times for which the called party monitored voicemails in a process of being left.

2. The method as claimed in claim 1 further comprising causing a displayable option to display on the internet protocol enabled television, wherein the displayable option allows the called party to take the telephone call as the called party listens to the calling party in the process of currently leaving the voicemail.

3. The method as claimed in claim 1, further comprising communicating, by the internet protocol television gateway, with a preferences server to determine the set top box, having requested to receive calling party information, out of a plurality of set top boxes at a subscriber location.

4. The method as claimed in claim 1, further comprising appending a call indication in the call log with the calling party.

5. The method as claimed in claim 1, wherein the device address includes a uniform resource locator.

6. A system for logging communication requests related to an internet protocol enabled television of a called party, the system comprising:
   an internet protocol television gateway; and
   a computer processing device of the internet protocol television gateway;
   the internet protocol television gateway receives a request to initiate a telephone call to a called party telephone number for a called party telephone, a set top box being associated with a device address that is mapped to the called party telephone number;
   the internet protocol television gateway retrieves caller identification information associated with a calling party;
   the internet protocol television gateway records the caller identification information in a call log stored on the internet protocol television gateway;
   in an event the calling party is in a process of currently leaving a voicemail in a voicemail infrastructure associated with the internet protocol television gateway, the internet protocol television gateway permits a selectable option for the called party to listen to the calling party while the calling party is in the process of currently leaving the voicemail;
   in response to the called party initiating the selectable option, the internet protocol television gateway allows the called party to listen to the calling party on the internet protocol enabled television while the calling party is in the process of currently leaving the voicemail; and
   the internet protocol television gateway stores in the call log stored on the internet protocol television gateway a decision of the called party to monitor the voicemail in the process of being left for the called party;
   wherein the call log stored on the internet protocol television gateway is configured to add an additional entry of whether the called party monitored the voicemail in the process of being left, whether the called party answered the telephone call while monitoring the voicemail in the process of being left, and times for which the called party monitored voicemails in a process of being left.

7. The system as claimed in claim 6, wherein the internet protocol television gateway permits a displayable option that allows the called party to take the telephone call as the called party listens to the calling party in the process of currently leaving the voicemail.

8. The system as claimed in claim 6, wherein the internet protocol television gateway appends a call indication in the call log with the calling party.

9. The system as claimed in claim 6, wherein the device address includes a uniform resource locator.

10. A computer program product for calls related to an internet protocol enabled television of a called party, the computer program product embodied on a non-transitory computer readable storage medium including instructions for causing a computer to implement a method, the method comprising:
   receiving a request to initiate a telephone call to a called party telephone number for a called party telephone, a set top box being associated with a device address that is mapped to the called party telephone number;

retrieving caller identification information associated with a calling party;

recording the caller identification information in a call log stored on an internet protocol television gateway;

in an event the calling party is in a process of currently leaving a voicemail in a voicemail infrastructure associated with the internet protocol enabled television, permitting a selectable option for the called party to listen to the calling party while the calling party is in the process of currently leaving the voicemail;

in response to the called party initiating the selectable option, allowing the called party to listen to the calling party on the internet protocol enabled television while the calling party is in the process of currently leaving the voicemail; and storing in the call log stored on the internet protocol television gateway a decision of the called party to monitor the voicemail in the process of being left for the called party;

wherein the call log stored on the internet protocol television gateway is configured to add an additional entry of whether the called party monitored the voicemail in the process of being left, whether the called party answered the telephone call while monitoring the voicemail in the process of being left, and times for which the called party monitored voicemails in a process of being left.

11. The computer program product as claimed in claim 10 wherein the method further comprises permitting a displayable option that allows the called party to take the telephone call as the called party listens to the calling party in the process of currently leaving the voicemail.

12. The computer program product as claimed in claim 10 wherein the method further comprises appending a call indication in the call log with the calling party.

13. The computer program product as claimed in claim 10, wherein the device address includes a uniform resource locator.

* * * * *